(12) United States Patent
Wang et al.

(10) Patent No.: US 12,399,812 B2
(45) Date of Patent: Aug. 26, 2025

(54) OBJECT SEALING FOR CACHE COHERENCY FOR SHARED MEMORY

(71) Applicant: MemVerge, Inc., Milpitas, CA (US)

(72) Inventors: Shu Wang, Milpitas, CA (US); Robert W. Beauchamp, Berlin, MA (US); Chenggong Fan, Saratoga, CA (US)

(73) Assignee: MemVerge, Inc., Milpitas, CA (US)

( * ) Notice: Subject to any disclaimer, the term of this patent is extended or adjusted under 35 U.S.C. 154(b) by 0 days.

(21) Appl. No.: 18/358,782

(22) Filed: Jul. 25, 2023

(65) Prior Publication Data

US 2024/0045804 A1    Feb. 8, 2024

Related U.S. Application Data

(60) Provisional application No. 63/503,647, filed on May 22, 2023, provisional application No. 63/394,257, filed on Aug. 1, 2022.

(51) Int. Cl.
| | |
|---|---|
| G06F 12/02 | (2006.01) |
| G06F 9/52 | (2006.01) |
| G06F 9/54 | (2006.01) |
| G06F 12/0815 | (2016.01) |

(52) U.S. Cl.
CPC ............ *G06F 12/023* (2013.01); *G06F 9/526* (2013.01); *G06F 9/544* (2013.01); *G06F 12/0815* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 6,760,815 B1 * | 7/2004 | Traversat | ............ | G06F 12/0276 |
| | | | | 711/E12.012 |
| 7,844,973 B1 * | 11/2010 | Dice | ........................ | G06F 9/52 |
| | | | | 710/200 |
| 11,042,496 B1 * | 6/2021 | BeSerra | .............. | G06F 13/4282 |

(Continued)

OTHER PUBLICATIONS

Norman Jouppi. "Cache Write Policies and Performance." May 1993. IEEE. SIGARCH Computer Architecture News. vol. 21. pp. 191-201. (Year: 1993).*

(Continued)

*Primary Examiner* — Nathan Sadler
(74) *Attorney, Agent, or Firm* — Paradice & Li LLP

(57) ABSTRACT

This disclosure provides methods, devices, and systems for memory management. The present implementations more specifically relate to techniques for providing shared memory services over a Compute Express Link (CXL) fabric. In some aspects, a memory management system may include a shared memory (SM) manager and multiple SM libraries each associated with a respective host device coupled to a shared memory via a CXL fabric. In some implementations, an SM library may negotiate read or write "locks" with the SM manager for an object in shared memory, where a read-lock grants the associated host device read access to the object and a write-lock grants the associated host device write access to the object. In some implementations, the SM manager may grant any number of read-locks, but only one write-lock, to any object in shared memory so that the object becomes immutable once the host device relinquishes its write-lock for the object.

20 Claims, 13 Drawing Sheets

(56) References Cited

U.S. PATENT DOCUMENTS

| | | | | |
|---|---|---|---|---|
| 2003/0210248 A1* | 11/2003 | Wyatt | ................. | G06F 12/0888 |
| | | | | 345/557 |
| 2004/0255087 A1* | 12/2004 | Pudipeddi | ........... | G06F 12/0261 |
| | | | | 711/147 |
| 2012/0180074 A1* | 7/2012 | Krishnamurthy | ....... | G06F 21/14 |
| | | | | 719/315 |
| 2020/0019332 A1* | 1/2020 | Danilov | .............. | G06F 11/1076 |
| 2021/0157521 A1* | 5/2021 | Roy | ........................ | G06F 3/067 |
| 2023/0236995 A1* | 7/2023 | Jayaraman | ............ | G06F 12/084 |
| | | | | 710/308 |
| 2024/0037026 A1* | 2/2024 | Price | ..................... | G06F 3/0631 |
| 2024/0256348 A1* | 8/2024 | Pean | ....................... | G06F 9/541 |

OTHER PUBLICATIONS

Dr. Debendra Das Sharma and Ishwar Agarwal, "Compute Express Link™: The Breakthrough CPU-to-Device Interconnect CXL™," retrieved on Oct. 31, 2023 from https://www.computeexpresslink.org/, pp. 1-4.

* cited by examiner

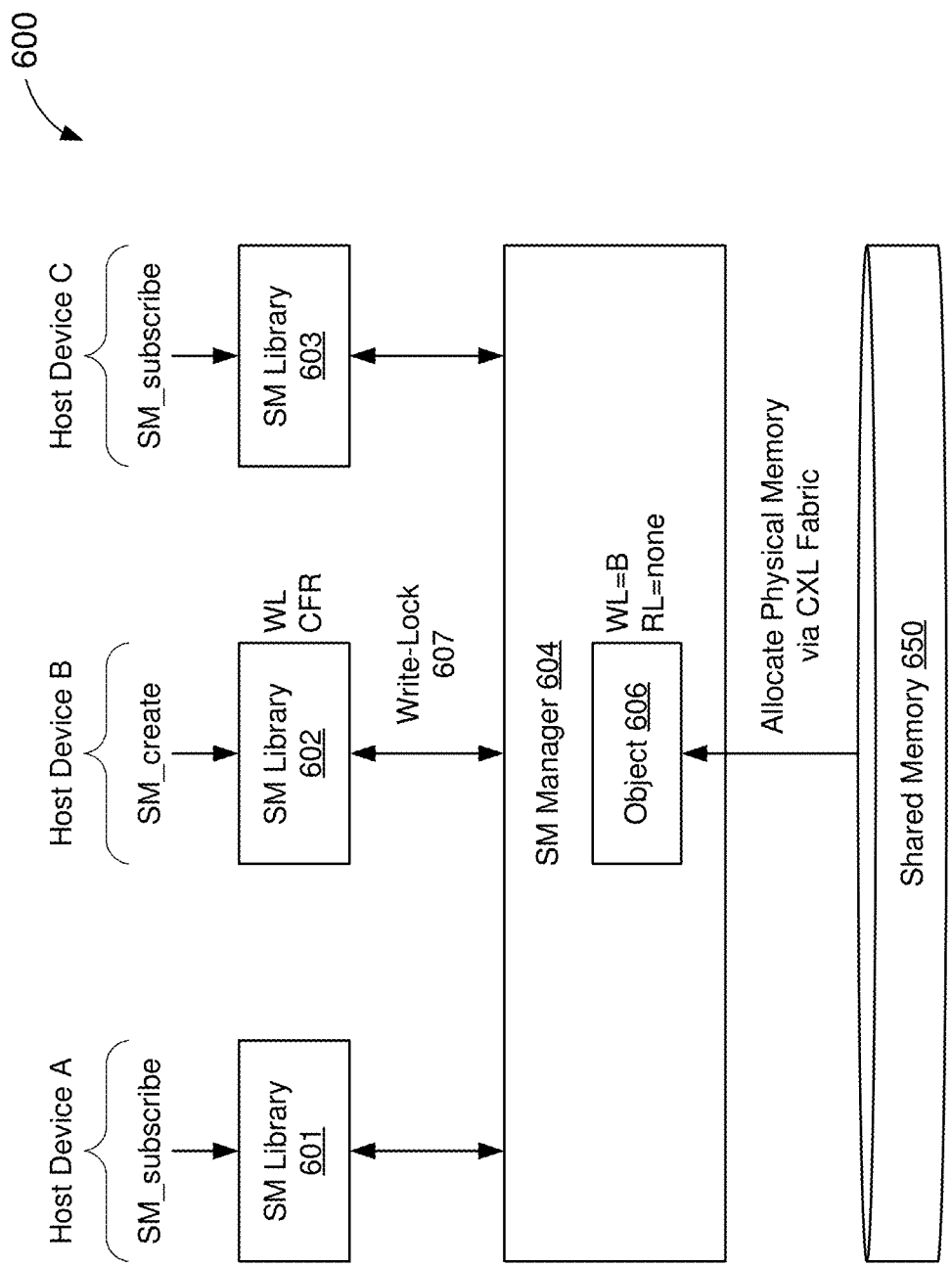

OBJECT SEALING FOR CACHE COHERENCY FOR SHARED MEMORY

CROSS-REFERENCE TO RELATED APPLICATION

This application claims priority and benefit under 35 USC § 119(e) to U.S. Provisional Patent Application No. 63/394,257, filed on Aug. 1, 2022, and to U.S. Provisional Patent Application No. 63/503,647, filed on May 22, 2023, which are incorporated herein by reference in their entireties.

TECHNICAL FIELD

The present implementations relate generally to memory management in computer systems, and specifically to techniques for managing cache coherency for shared memory.

BACKGROUND OF RELATED ART

Memory is generally used to store data for quick or immediate access by a computer system or processing resource. Many computer systems include a memory controller that reads data from, and writes data to, memory on behalf of various processing resources. The physical media that carries the data between the memory controller and the memory resources is generally referred to as a "memory bus." Many existing memory buses (such as double data rate (DDR) memory buses) have physical constraints and timing protocols that require the memory resources to be located in relatively close proximity of the memory controller. As a result, many existing computer systems have local memory disposed on or within the computer system itself. Locally attached memory and processing resources are in the same "coherency domain."

New interconnect technologies are being developed to enable high-bandwidth, low-latency memory access over greater distances. For example, Compute Express Link (CXL) is an open standard interconnect that supports communications between a processor and memory over a Peripheral Component Interconnect Express (PCIe) link. As a result, CXL can extend coherency domains beyond small, localized fabrics to larger fabrics spanning multiple computer systems or remotely located devices. The CXL standard has led to improvements in memory usage and allocation (such as pooling of memory resources). As interconnect technologies continue to evolve, new memory management techniques are needed to support such advancements in memory usage and allocation.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of memory management. The method includes creating an object in a memory shared by a plurality of host computing devices over a Compute Express Link (CXL) fabric; mapping a write-lock to the object in the shared memory responsive to creating the object, where the write-lock grants a first host computing device of the plurality of host computing devices exclusive access for writing to the object; receiving a request from the first host computing device to relinquish the write-lock; and sealing the object in the shared memory so that the object is immutable based on the request to relinquish the write-lock.

Another innovative aspect of the subject matter of this disclosure can be implemented in a memory management system, including a processing system and a memory. The memory stores instructions that, when executed by the processing system, cause the memory management system to create an object in a memory shared by a plurality of host computing devices over a CXL fabric; map a write-lock to the object in the shared memory responsive to creating the object, where the write-lock grants a first host computing device of the plurality of host computing devices exclusive access for writing to the object; receive a request from the first host computing device to relinquish the write-lock; and seal the object in the shared memory so that the object is immutable based on the request to relinquish the write-lock.

Another innovative aspect of the subject matter of this disclosure can be implemented in a method of memory management. The method includes receiving a request to delete an object in a memory shared by a plurality of host computing devices; determining whether each host computing device of the plurality of host computing devices has ever accessed the object; flushing a respective cache associated with any host computing device of the plurality of host computing devices that has ever accessed the object; and deleting the object from the shared memory after flushing all the caches associated with any host computing device of the plurality of host computing devices that has ever accessed the object.

BRIEF DESCRIPTION OF THE DRAWINGS

The present implementations are illustrated by way of example and are not intended to be limited by the figures of the accompanying drawings.

FIGS. 6A-6E show a series of operations that can be performed by a memory management system, according to some implementations.

DETAILED DESCRIPTION

Figure 1:
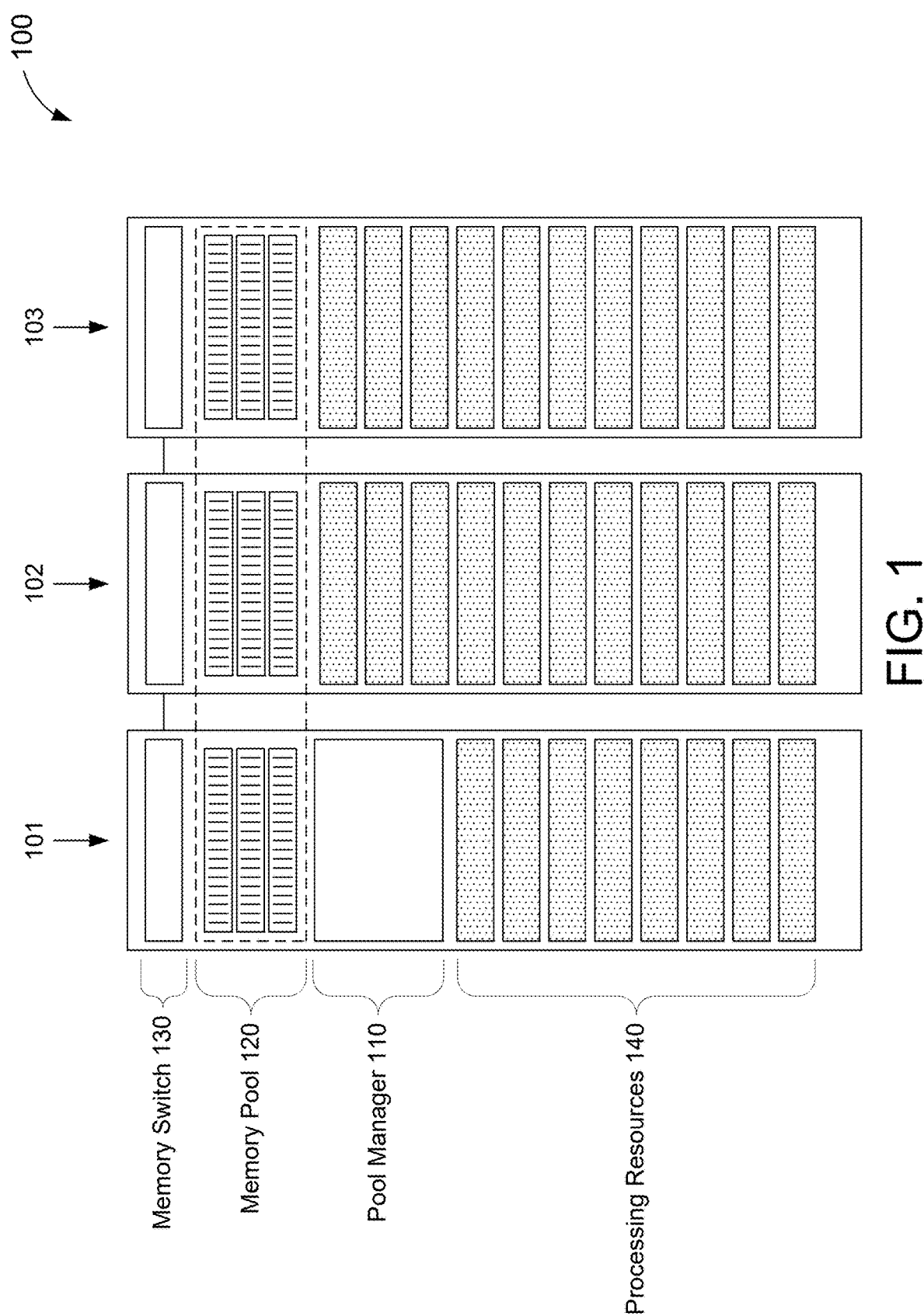
FIG. 1 shows a hardware diagram of an example computer system with pooled memory resources.

In the following description, numerous specific details are set forth such as examples of specific components, circuits, and processes to provide a thorough understanding of the present disclosure. The term "coupled" as used herein means connected directly to or connected through one or more intervening components or circuits. The terms "computer system," "electronic system," and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, Compute Express Link (CXL) is an open standard interconnect that supports communications between a processor and memory over a Peripheral Component Interconnect Express (PCIe) link. A CXL system (or subsystem) includes a host computing device (also referred to simply as a "host device") and one or more CXL devices. The host device represents a root complex of the CXL system, whereas a CXL device can be any endpoint device coupled to the host device. Example CXL devices include Type 1 devices (such as accelerator devices without any locally-attached memory), Type 2 devices (such as accelerator devices with locally-attached memory that can be accessed by the host device), and Type 3 devices (such as passive memory expansion devices). A CXL fabric is a collection of one or more switches that rely on Hierarchy Based Routing (HBR) or Port Based Routing (PBR) messages to support flexible, low-latency switching between the host devices and CXL devices of a given CXL system.

A coherency domain includes all memory and processing resources associated with a single coherent Host Physical Address (HPA) space. In existing computer systems, coherency domains were limited to small, localized fabrics built upon proprietary memory buses. The CXL standard defines a set of protocols that can be used to extend coherency domains to larger fabrics spanning multiple host devices, multiple CXL devices, or any combination thereof. As such, the CXL standard opens up new possibilities for storing and accessing data (such as memory pooling and sharing). Aspects of the present disclosure recognize that the speed and flexibility of the CXL architecture allows memory to be provided as a "service." As used herein, the term "memory service" refers to any combination of hardware or software that manages or monitors the storage of data, and access thereto, on behalf of one or more host devices.

For example, a CXL fabric can connect multiple host devices to the same memory resource(s). This allows data stored in such memory resources to be shared between the host devices. Many computing devices utilize local caches (which are much closer to the processor than other memory resources) to buffer data for quicker access. For example, when operating on shared data, a host device may load a copy of the data from shared memory to a local cache and subsequently read or modify the cached copy of the data. Thus, cache coherency techniques are needed to maintain consistency among the local caches (such as to ensure that the local caches do not store different copies of the same shared data). Recent updates to the CXL standard provide cache coherency mechanisms that can be implemented in hardware, by allowing a host device to "snoop" the cache lines of other host devices coupled to the same shared memory, for example, to detect the most recent contents of each cache line. As such, hardware-based cache coherency often requires a significant amount of overhead and generates substantial traffic at larger scales. Aspects of the present disclosure recognize that implementing cache coherency in software can significantly reduce the cost and complexity of a CXL system with shared memory.

Various aspects relate generally to memory management, and more particularly, to techniques for maintaining cache coherency between host devices coupled to a shared memory via a CXL fabric. In some aspects, a memory management system may include a shared memory (SM) manager and multiple SM libraries each associated with a respective host device that is coupled to a shared memory via a CXL fabric. Each SM library communicates with the SM manager to acquire and manage access to the shared memory on behalf of its associated host device. The SM manager creates, configures, and deletes objects in the shared memory responsive to requests from the SM libraries. A memory "object" is a virtual memory allocation that can be managed in software. For example, an object may define an address space in shared memory that can be used for storage by one or more host devices.

In some aspects, an SM library may negotiate read or write "locks" with the SM manager for an object in shared memory, where a read-lock grants the associated host device read access to the object and a write-lock grants the associated host device write access to the object. In some implementations, the SM manager may grant any number of read-locks, but only one write-lock, to any object in shared memory. In other words, an object in shared memory becomes immutable once the host device that created the object relinquishes its write-lock for the object. Immutable objects cannot be modified or rewritten. Any storage in shared memory that is allocated for an immutable object can be written to again only after the object is deleted. In some implementations, the SM manager may require each host device that has accessed an object in shared memory to flush or otherwise clear its cache before deleting the object.

Particular implementations of the subject matter described in this disclosure can be implemented to realize one or more of the following potential advantages. By creating immutable objects in shared memory, aspects of the present disclosure can ensure cache coherency among host devices coupled to the shared memory via a CXL fabric. Because only the creator of an object can write to the object, and because the data stored in the object cannot be modified after the object is made immutable, the host devices cannot have inconsistent copies of shared data in their local caches. By requiring all host devices that accessed an object in shared memory to flush their caches before the object can be deleted, aspects of the present disclosure can further ensure that none of the host devices have stale or invalid data in their local caches.

FIG. 1 shows a hardware diagram of an example computer system 100 with pooled memory resources. The computer system includes a pool manager 110, a memory pool 120, a memory switch 130, and one or more processing resources 140. In some aspects, the processing resources 140 may include one or more computing servers.

The memory pool 120 may include any number of memory resources, such as volatile memory, non-volatile memory, or any combination thereof. In some implementations, the memory resources in the memory pool 120 may be distributed across different locations or devices. In the example of FIG. 1, a first portion of the memory pool 120 is disposed on a first server rack 101, a second portion of the memory pool 120 is disposed on a second server rack 102, and a third portion of the memory pool 120 is disposed on a third server rack 103. In some implementations, the number or types of memory resources disposed on each of the server racks 101-103 may vary. For example, the first portion of the memory pool 120 (disposed on the first server rack 101) may include a different number of memory resources than the second portion of the memory pool 120 (disposed on the second server rack 102).

The memory switch 130 serves as a memory access interface between the processing resources 140 and the memory pool 120. More specifically, the memory switch 130 may allow any of the processing resources 140 to write data to, or read data from, any of the memory resources in the memory pool 120 (regardless of their physical locations). For example, the memory switch 130 may facilitate memory access operations (such as read or write access) between processing resources 140 disposed on the first server rack 101 and memory resources disposed on any of the second or third server racks 102 or 103. In some implementations, the memory switch 130 may form at least part of a Compute Express Link (CXL) fabric conforming to the CXL open standard. For example, the memory switch 130 may be a CXL switch.

The pool manager 110 manages or maintains the memory pool 120. In some aspects, the pool manager 110 may dynamically provision memory resources in the memory pool 120 to be used by the processing resources 140. For example, the pool manager 110 may allocate a subset of memory resources from the memory pool 120 to a particular processing resource 140, when needed, and may deallocate the subset of memory resources when they are no longer needed by the particular processing resource 140. Aspects of the present disclosure recognize that some pages of memory may become locked (or "pinned") by a processing resource 140 for long-term or persistent use, which may prevent the processing resource 140 from releasing the entire extent of memory containing the pinned page.

In some implementations, the memory resources in the memory pool 120 may be dynamically allocated on a per-page basis. For example, the pool manager 110 may map the entire memory pool 120 (or a portion thereof) to a group of processing resources 140 and may dynamically allocate (and deallocate) individual pages of memory associated with the memory pool 120 for individual processing resources 140 within the group. As a result, a processing resource 140 may be provisioned a subset of memory pages associated with the memory pool 120, when needed, and may release (back into the memory pool 120) individual pages of memory that are no longer in use. More specifically, the processing resource 140 may continue to maintain any pages of memory that are pinned or otherwise needed for future use.

In some other aspects, the pool manager 110 may allow sharing of memory resources in the memory pool 120. For example, the pool manager 110 may provision a set of memory resources from the memory pool 120 to be concurrently accessible to multiple processing resources 140 (such as for distributed computing or data processing applications). Still further, in some aspects, the pool manager 110 may transparently "heal" memory that is worn or is otherwise failing. For example, upon detecting one or more failing memory resources (such as indicated by an error rate associated with memory access operations), the pool manager 110 may provision new memory resources in the memory pool 120 to replace the failing memory resources and may proceed to migrate any data stored on the failing memory resources to the newly allocated memory resources.

Figure 2:
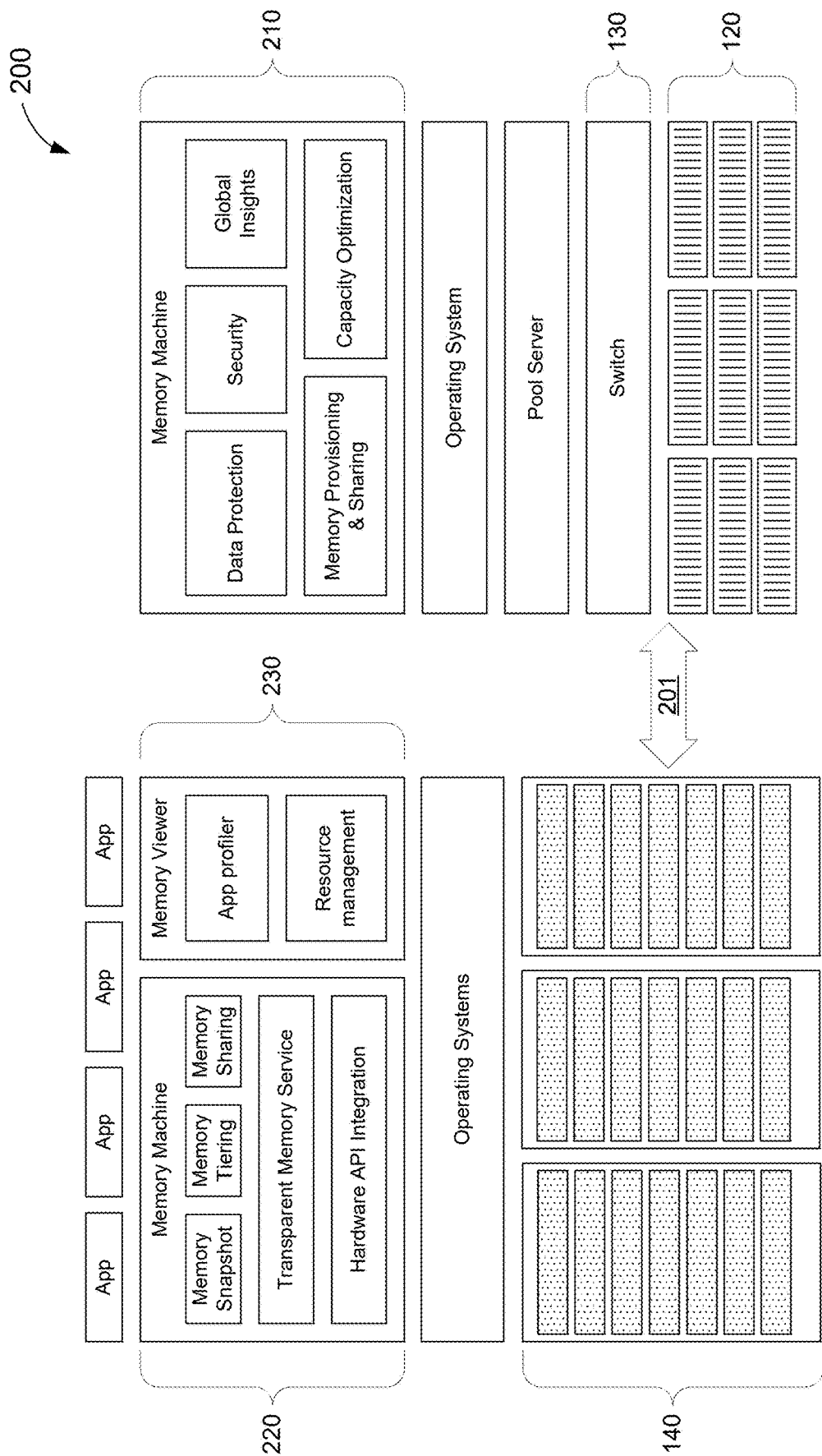
FIG. 2 shows a block diagram of an example computer system with pooled memory services, according to some implementations.

FIG. 2 shows a block diagram of an example computer system 200 with pooled memory services, according to some implementations. In some implementations, the computer system 200 may be one example of the computer system 100 of FIG. 1. For example, the computer system 200 is shown to include the memory pool 120, the switch 130, and the processing resources 140 of FIG. 1. As shown in FIG. 2, the processing resources 140 are coupled to the memory switch 130 via a high-bandwidth, low-latency interconnect 201. In some implementations, the interconnect 201 may be a Peripheral Component Interconnect Express (PCIe) link.

The computer system 200 further includes a pool manager 210, a memory machine 220, and a memory viewer 230. In some implementations, the pool manager 210 may be one example of the pool manager 110 of FIG. 1. As described with reference to FIG. 1, the pool manager 210 is configured to manage or maintain the memory pool 120. In some aspects, the pool manager 210 may provide a number of services in connection with managing the memory pool 120 (also referred to as "memory services"). Memory services can be categorized or classified according to various functionality, hardware, software, or performance requirements. Example memory service classes may include memory pooling services, memory sharing services, capacity optimization services, data protection services, security services, and global insights, among other examples. Thus, different classes of memory service may require different configurations of the CXL fabric. For example, memory sharing services may require multiple host devices to be able to communicate with the same memory (or CXL device). On the other hand, capacity optimization services may require the same host device to be able to communicate with multiple memory (or CXL devices).

In some implementations, the memory pooling services may include a service for partitioning the memory pool 120. For example, the pool manager 210 may maintain an allocation table that indicates which memory resources in the memory pool 120 have been allocated to which processing resources 140. In some other implementations, the memory pooling services may include a service for allocating an unshared memory partition to a system with orchestration of hot add (such as when new physical memory resources are added to the memory pool 120. In some other implementations, the memory pooling services may include a service for orchestrating hot remove and freeing memory partitions back to the memory pool 120. For example, the pool manager 210 may deallocate memory resources that are no longer in use by any of the processing resources 140. Still further, in some implementations, the memory pooling services may include a service for allocating a memory partition to multiple systems in a cluster and orchestrating page-level sub-allocation within that cluster-wide mapped pool (such as described with reference to FIG. 1).

In some implementations, the data protection services may include a service for capturing or acquiring a snapshot of memory. For example, the pool manager 210 may store a copy of the data in one or more memory resources in the memory pool 120 at any given time. In some other implementations, the data protection services may include a service for adding a check signature for each page of memory in a given snapshot. For example, the pool manager 210 may store a checksum that can be used to validate or otherwise detect errors in the snapshot for one or more pages of memory. In some other implementations, the data protection services may include a service for replicating N-of-M redundancy across independent memory failure domains. For example, the pool manager 210 may store a number (M) of units of data that includes a number (N) of units of original information plus redundancy, where any N data units of the M stored data units can be used to recover the original information in its entirety). Still further, in some implementations, the data protection services may include a service for serializing data to storage. For example, the pool manager 210 may copy data in the memory pool 120 to a data store such as, for example, an HDD or an SSD.

In some implementations, the memory sharing services may include a service for allocating a shared memory partition to multiple systems with orchestration of hot add and configuration of coherency ownership. For example, the pool manager 210 may maintain cache coherency for processing resources 140 that share concurrent access to the same subset of memory resources (such as described with reference to FIG. 1). In some other implementations, the memory sharing services may include a service for naming memory spaces. For example, the pool manager 210 may assign names to shared memory spaces within the memory pool 120 so that the shared memory spaces can be identified by name and mapped to a process address space, thus allowing the data stored in the named memory spaces to be shared by multiple data processes. Still further, in some implementations, the memory sharing services may include a service for cloning snapshots. For example, the pool manager 210 may provide a copy of a snapshot of the memory pool 120 to one or more processing resources 140 to allow the processing resources 140 to quickly bootup to a desired memory state or perform different processes or modifications on the stored data without losing the original "baseline" memory state.

In some implementations, the capacity optimization services may include a service for tiering to compressed memory. For example, the pool manager 210 may move data from the memory pool 120 to compressed memory, such as to optimize for cost, load, or various other factors. In some other implementations, the capacity optimization service may include a service for tiering to storage. For example, the pool manager 210 may move data from the memory pool 120 to a data store, such as to optimize for cost, load, or various other factors. In some implementations, the security services may include a service for access control. For example, the pool manager 210 may prevent processing resources 140 from accessing data in the memory pool 120 to which they are not authorized. In some other implementations, the security services may include a service for managing transport encryption. For example, the pool manager 210 may add point-to-point encryption of data as it is communicated to or from the memory pool 120 (such as from one end of the interconnect 201 to another).

The memory machine 220 may reside with the processing resources 140 to implement various memory services supported by the pool manager 210 and provide hardware application programming interface (API) integration for the processing resources 140. In some implementations, the memory machine 220 may expand the memory capacity available to the processing resources 140 by providing a software-defined memory pool with intelligent auto-tiering. For example, the memory machine 220 may implement memory snapshot, memory tiering, or memory sharing services for individual processing resources 140. In some other implementations, the memory machine 220 may accelerate the time-to-discovery for the processing resources 140 by providing transparent checkpointing or other transparent memory services. For example, the memory machine 220 may allow a processing resource 140 to roll back, restore, or clone data from any of the memory resources in the memory pool 120 at any given time. Still further, in some implementations, the memory machine 220 may reduce the cost of cloud services by enabling long-running applications to use low-cost cloud automation instances or by integrating with cloud automation and scheduler to automatically recover from preemptions.

The memory viewer 230 is configured to provide system administrators (or users) with comprehensive insight into the physical topology of the memory pool 120 as well as how application memory is utilized. In some implementations, the memory viewer 230 may allow system administrators to ensure memory configuration accuracy by providing a real-time view of the memory configuration as well as the bandwidth of each type of memory hardware. For example, such information may be presented in a graphical user interface (GUI) that can be displayed to a user or system administrator. In some other implementations, the memory viewer 230 may help system administrators to optimize their memory configurations for a given workload by providing a heatmap that shows the memory usage patterns of different types of memory resources (with different access latencies). For example, the system administrator may implement memory tiering based on the information provided in the heatmap (such as by moving "cold" data that is infrequently used to lower-cost memory with higher access latencies).

Figure 3:
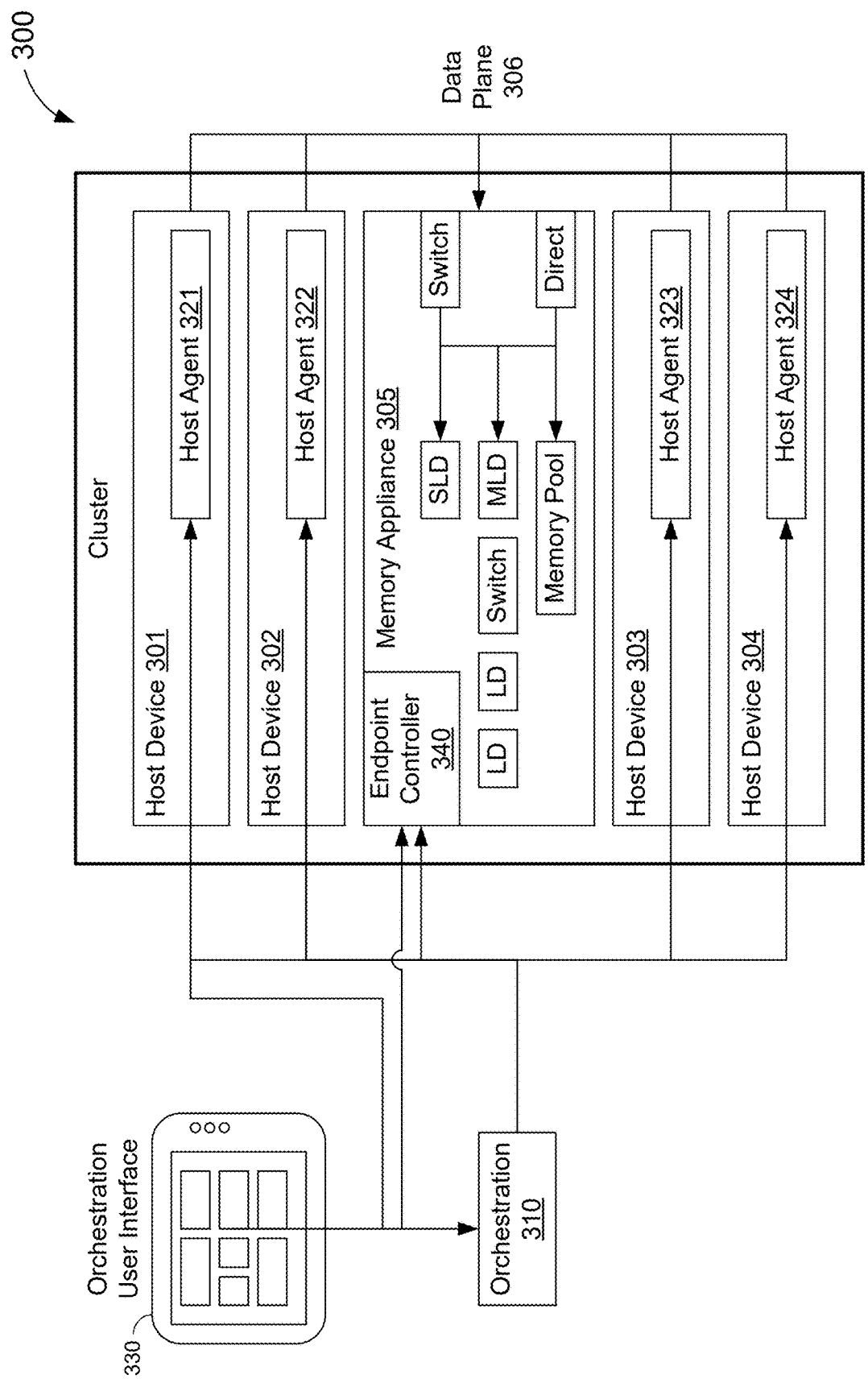
FIG. 3 shows a block diagram of an example memory management system, according to some implementations.

FIG. 3 shows a block diagram of an example memory management system 300, according to some implementations. In some implementations, the system 300 may be one example of any of the computer systems 100 or 200 of FIGS. 1 and 2, respectively. For example, the memory management system 300 may support pooling, sharing, or dynamically provisioning external memory for distributed processing resources. In the example of FIG. 3, the external memory is disposed on a memory appliance 305 and the processing resources are disposed on a number of host computing devices 301-304 communicatively coupled to the memory appliance 305 via a data plane 306.

The memory appliance 305 may be any device or hardware that aggregates or otherwise provides memory resources for access by an external host. In some aspects, the memory appliance may be a CXL device. With reference to FIGS. 1 and 2, the memory appliance 305 may be one example of the memory pool 120. In some implementations, the memory appliance 305 may not have any local processing resources (such as a Type 3 CXL device or memory expander). In some other implementations, the memory appliance 305 also may include local processing resources (such as Type 2 CXL device or a server). In such implementations, the external memory resources provided by the memory appliance 305 may include memory that is locally attached to one or more processing resources residing on the memory appliance 305.

The host computing devices 301-304 may include any device or hardware having local processing resources (such as a server) that can write data to, or read data from, the external memory provided by the memory appliance 305. In some aspects, each of the host computing devices 301-304 may represent a root complex of a respective CXL subsystem. With reference to FIGS. 1 and 2, the host computing devices 301-304 may be examples of the processing resources 140. The data plane 306 may include various physical or logical interconnects that support the transfer of data between the memory appliance 305 and the host computing devices 301-304. In some aspects, the data plane 306 may include a CXL fabric that conforms to the CXL open standard. With reference for example to FIGS. 1 and 2, the data plane 306 may include the memory switch 130, the interconnect 201, or any combination thereof.

In some aspects, the memory management system 300 may dynamically configure (and reconfigure) the data plane 306 to support various memory transactions and services between the memory appliance 305 and the host computing devices 301-304. As described with reference to FIGS. 1 and 2, example memory services may include, among other examples, memory pooling services (including capacity monitoring and resource provisioning), capacity optimization services (including performance monitoring and tiering), data sharing services (including software-enforced memory coherency), and data protection services (including user software snapshot). Although one memory appliance 305 and four host computing devices 301-304 are depicted in the example of FIG. 3, in actual implementations the memory management system 300 may dynamically configure the data plane 306 to support memory transactions and services between any number of memory appliances and any number of host computing devices (including multiple CXL systems or multiple CXL subsystems).

The memory management system 300 includes an orchestration component 310, host agents 321-324, an orchestration user interface (UI) 330, and endpoint controller 340. The endpoint controller 340 is configured to manage the memory resources disposed on, or attached to, the memory appliance 305. In some implementations, the endpoint controller 340 may reside or execute on the memory appliance 305. For example, the endpoint controller 340 may manage read or write access (by the host computing devices 301-304) to a memory pool or various logical devices (LDs), including single logical devices (SLDs) and multiple logical devices (MLDs), among other examples.

Each of the host agents 321-324 is configured to provide one or more memory services for a respective one of the host computing devices 301-304. In some implementations, the host agents 321-324 may reside or execute on the host computing devices 301-304, respectively, and may communicate with the endpoint controller 340 via the orchestration component 310. With reference to FIG. 2, each of the host agents 321-324 may be one example or instance of the memory machine 220. In some implementations, each of the host agents 321-324 may manage multiple components of each supported memory service, including core and data services. Core service components may provide interoperability with other components of the memory management system 300. Example core service components may include local databases, hardware driver support, or interconnect management software, among other examples. By contrast, data service components may provide non-core functionality. Example data service components may include performance monitoring, external memory provisioning, or software-coherency controls, among other examples.

The orchestration component 310 coordinates interactions between the endpoint controller 340 and the host agents 321-324. With reference to FIG. 2, the orchestration component 310 may be one example of the pool manager 210. In some implementations, the orchestration component 310 may manage a global shared state between disparate hosts. For example, the global shared state may include memory provisioning information indicating portions of the external memory resources (if any) that are owned by individual host computing devices 301-304 (such as where each of the host computing devices is associated with a different coherency domain). In some aspects, the orchestration component 310 may reside or execute on one of the host computing devices 301-304. In some other aspects, the orchestration component 310 may reside or execute on the memory appliance 305. Still further, in some aspects, the orchestration component 310 may reside or execute on a dedicated host computing device that does not include a host agent or endpoint controller.

The orchestration UI 330 may be any user interface (such as a GUI or command line) that can interact with the orchestration component 310, the host agents 321-324, or the endpoint controller 340 to provide external memory orchestration. With reference to FIG. 2, the orchestration UI 330 may be one example of the memory viewer 230. In some implementations, the orchestration UI 330 may be a web browser-based graphical software suite which communicates with other components of the memory management system 300 via hypertext transfer protocol (HTTP) requests. In some other implementations, the orchestration UI 330 may be a command line terminal software suite which communicates with other components of the memory management system 300 via remote procedure calls (RPCs). In some aspects, the orchestration UI 330 may reside or execute on the same computer system as the orchestration component 310. In some other aspects, the orchestration UI 330 may reside or execute on a personal computer that is communicatively coupled to the computer system executing the orchestration component 310 (such as via one or more networks).

In some aspects, the memory management system 300 may provide a hardware abstraction layer (HAL) or interface between the memory services and a CXL fabric that couples or otherwise interconnects the host computing devices 301-304 and the memory appliance 305. For example, the CXL standard defines a "fabric manager" that controls aspects of a CXL system related to binding and management of pooled ports and devices. More specifically, the CXL standard provides a fabric manager API that can be used to configure a CXL fabric. In some implementations, the orchestration component 310 (or other components of the memory management system 300) may implement or utilize the fabric manager API to dynamically configure (and reconfigure) the data plane 306 based on the needs or requests of the memory services. For example, the data plane 306 (or CXL fabric) can be used to provision memory resources in the memory appliance 305 for storing data associated with one or more of the host computing devices 301-304. In other words, the memory management system 300 exposes the features and capabilities of the of the CXL fabric to the memory services supported by the host computing devices 301-304.

Figure 4:
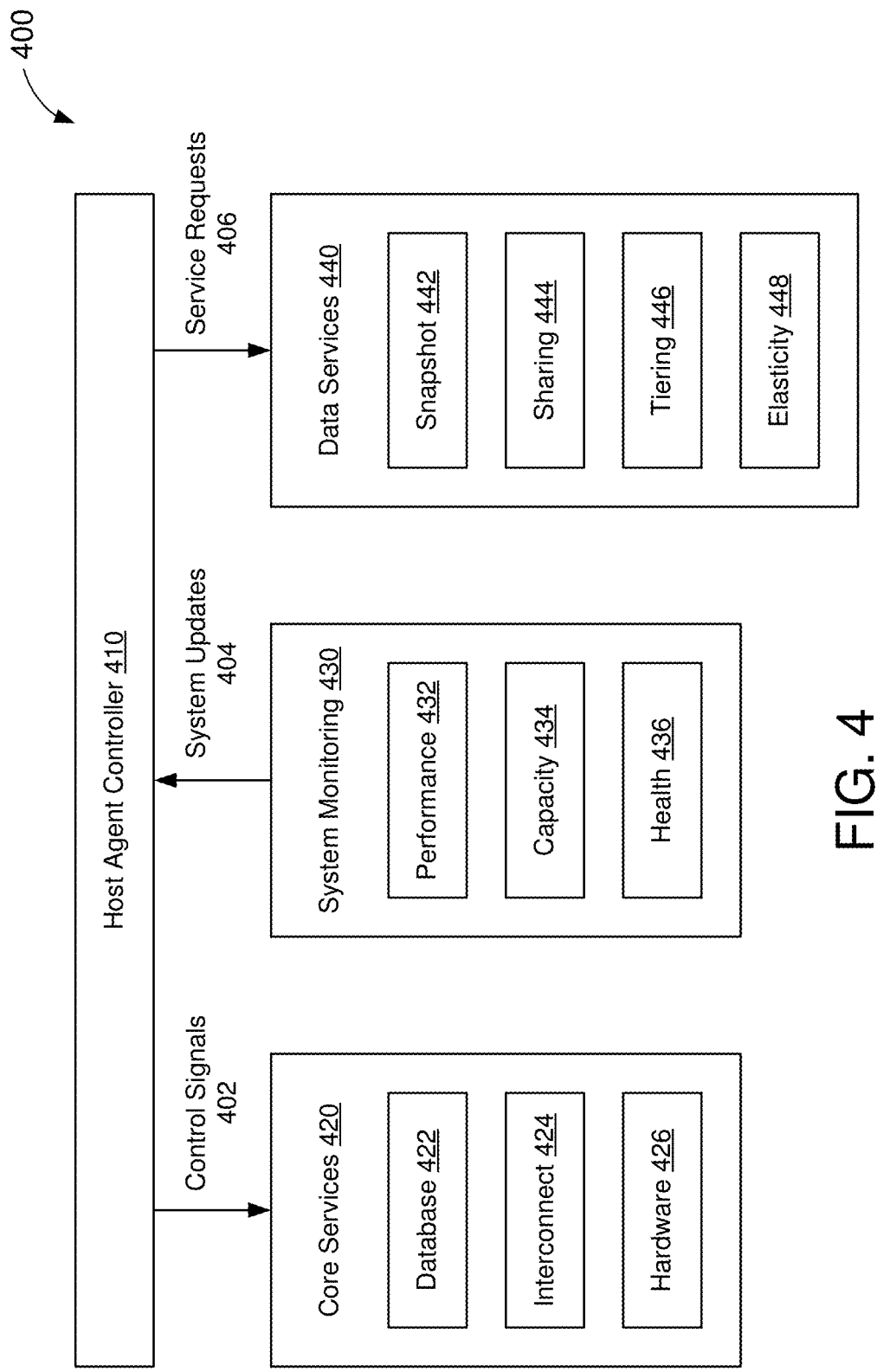
FIG. 4 shows a block diagram of an example host computing device, according to some implementations.

FIG. 4 shows a block diagram of an example host agent 400, according to some implementations. The host agent 400 is a component of a memory management system that provides one or more memory services (including core services and data services) for a host computing device of a CXL system or subsystem. For example, the host agent 400 may reside or execute on the respective host computing device. In some implementations, the memory management system may be one example of the memory management system 300 of FIG. 3. With reference for example to FIG. 3, the host agent 400 may be one example of any of the host agents 321-324.

In some aspects, the host agent 400 may provide the memory services based, at least in part, on one or more external memory resources. As used herein, the term "external memory resource" may refer to any memory that is attached to a CXL device (such as the memory appliance 305 of FIG. 3) or is otherwise coupled to the host computing device via a CXL fabric (such as the data plane 306). In some implementations, the host agent 400 may dynamically configure (and reconfigure) the CXL fabric to facilitate data transactions or other communications between the host computing device and the external memory resources. The host agent 400 includes a host agent controller 410, a core services component 420, a system monitoring component 430, and a data services component 440. The host agent controller 410 manages interactions between the components 420, 430, and 440 of the host agent 400 and other components of the memory management system (such as the orchestration component 310 of FIG. 3) to implement the memory services supported by the host agent 400.

The core services component 420 enables the host agent 400 to access or communicate with other components of a CXL system (or subsystem). In some implementations, the core services component 420 may include a database management service 422, an interconnect management service 424, and a hardware management service 426. The database management service 422 is configured to manage a local database (on the host computing device) for storing data and other information associated with one or more memory services. The interconnect management service 424 is configured to create and manage pathways for routing data and other information through the CXL fabric. The hardware management service 426 is configured to manage various hardware drivers on the host computing device so that the host agent 400 can operate other hardware components of the CXL system. The core services component 420 may configure the database, interconnects, or hardware drivers responsive to control signals 402 from the host agent controller 410.

The system monitoring component 430 is configured to monitor various aspects of the host computing device or the CXL system (or subsystem). In some implementations, the system monitoring component 430 may include a performance monitoring service 432, a capacity monitoring service 434, and a health monitoring service 436. The performance monitoring service 432 is configured to monitor various performance metrics associated with the host computing device or the CXL system (such as a bandwidth, speed, latency, or power consumption of data transactions). The capacity monitoring service 434 is configured to monitor a storage capacity of any memory (or other data storage) available to the host computing device (including locally-attached memory or external memory resources). The health monitoring service 436 is configured to monitor a health of various hardware components of the host computing device (such as memory failures or other device or component failures). The system monitoring component 430 may report the monitored conditions to the host agent controller 410 via system updates 404.

The data services component 440 is configured to provide non-core services related to the management of data. In some implementations, the data services component 440 may include a memory snapshot service 442, a memory sharing service 444, a memory tiering service 446, and a memory elasticity service 448. The memory snapshot service 442 is configured to capture or acquire a snapshot of data stored in memory (such as locally-attached memory or external memory). The memory sharing service 444 is configured to manage or maintain one or more cache coherency states associated with any data stored in memory shared with other host computing devices. The memory tiering service 446 is configured to manage the movement or storage of data to different storage media based on various memory tiers. The memory elasticity service 448 is configured to dynamically allocate memory resources from a memory pool to the host computing device (and release the memory resources back into the memory pool). The data services component 440 may perform various actions associated with the data services responsive to service requests 406 from the host agent controller 410.

In the example of FIG. 4, the data services component 440 is shown to provide four data services for the host computing device. In some other implementations, the data services component 440 may provide fewer or more data services than those depicted in FIG. 4. As described with reference to FIG. 2, memory snapshot services, memory sharing services, memory tiering services, and memory elasticity services belong to different classes of memory services. More specifically, each of the data services may require the CXL fabric to be configured in a particular way (such as to provision specific memory resources suitable for the data service). In some aspects, the host agent 400 may configure the CXL fabric based, at least in part, on the class of memory service associated with each data service provide by the data services component 440.

In some implementations, to support memory snapshot services, the host agent controller 410 may produce one or more control signals 402 instructing the interconnect management service 424 to establish a data path, via the CXL fabric, from the host computing device to an external memory suitable for storing a snapshot of any data stored in locally-attached memory. The host agent controller 410 may further produce one or more service requests 406 instructing the memory snapshot service 442 to provision at least a portion of the external memory to be used for storing the snapshots of the locally-attached memory. Thereafter, the memory snapshot service 442 may capture or acquire snapshots of the data stored in the locally-attached memory (such as in response to various trigger conditions) and store the snapshots in the external memory.

In some implementations, to support memory sharing services, the host agent controller 410 may produce one or more control signals 402 instructing the interconnect management service 424 to establish a data path, via the CXL fabric, from the host computing device to an external memory suitable for storing data that can be shared among multiple host computing devices. The host agent controller 410 may further produce one or more service requests 406 instructing the memory sharing service 444 to provision at least a portion of the external memory to be used for sharing data between the host computing devices. Thereafter, the memory sharing service 444 may manage one or more cache coherency states associated with the data stored in the shared memory (such as in response to memory access requests initiated by the local host computing device or another host computing device having access to the shared memory).

In some implementations, to support memory tiering services, the host agent controller 410 may produce one or more control signals 402 instructing the interconnect management service 424 to establish a data path, via the CXL fabric, from the host computing device to an external memory associated with a different memory tier than the locally-attached memory. The host agent controller 410 may further produce one or more service requests 406 instructing the memory tiering service 446 to provision at least a portion of the external memory to be used for offloading data assigned to a lower (or higher) memory tier than that of the locally-attached memory. Thereafter, the memory tiering service 446 may move data between the locally-attached memory and the external memory based on various triggers that assign (or reassign) the data to different memory tiers.

In some implementations, to support elastic memory services, the host agent controller 410 may produce one or more control signals 402 instructing the interconnect management service 424 to establish a data path, via the CXL fabric, from the host computing device to an external memory associated with a memory pool. The host agent controller 410 may further produce one or more service requests 406 instructing the memory elasticity service 448 to provision at least a portion of the external memory to be used by one or more virtual machines (or tasks) executing on the host computing device. Thereafter, the memory elasticity service 448 may dynamically allocate (or release) resources from the memory pool based on the memory requirements of each system workload.

Aspects of the present disclosure recognize that updates associated with the data services may require the CXL fabric to be reconfigured (such as to provision new memory resources, deprovision existing memory resources, or otherwise rebalance or optimize memory usage). In some aspects, the host agent 400 may dynamically reconfigure the CXL fabric based on updates received from the host computing device or other device coupled to the CXL fabric (such as a CXL device or another host computing device). Example suitable updates include, among other examples, manual inputs received from a user of the host computing device (such as via the orchestration UI 330 of FIG. 3), performance-related events indicating a change in the performance of the CXL system, capacity-related events indicating a change in the storage capacity associated with the CXL system, health-related events indicating a change in the health of the CXL system, and various requests initiated by applications executing on the host computing device (such as the launch of a hypervisor or scheduler integration).

In some aspects, the host agent 400 may reconfigure the CXL fabric based on updates associated with memory snapshot services. For example, the host agent controller 410 may produce one or more control signals 402 instructing the interconnect management service 424 to tear down one or more existing data paths through the CXL fabric or to establish a new data path from the host computing device to another external memory or storage (such as an HDD or an SSD). Alternatively, or in addition, the host agent controller 410 may produce one or more service requests 406 instructing the memory snapshot service 442 to deprovision one or more external memory resources currently allocated to the host computing device or to provision other external memory resources to be used for storing snapshots of the locally-attached memory. In some implementations, the host agent controller 410 may produce one or more service requests 406 instructing the memory snapshot service 442 to offload a snapshot from external memory to a more permanent storage solution (such as HDD or SSD).

In some aspects, the host agent 400 may reconfigure the CXL fabric based on updates associated with memory sharing services. For example, the host agent controller 410 may produce one or more control signals 402 instructing the interconnect management service 424 to tear down one or more existing data paths through the CXL fabric or to establish a new data path from the host computing device to another external memory. Alternatively, or in addition, the host agent controller 410 may produce one or more service requests 406 instructing the memory sharing service 444 to deprovision one or more external memory resources currently allocated to the host computing device or to provision other external memory resources to be used for storing data shared by multiple host computing devices. In some implementations, the host agent controller 410 may produce one or more service requests 406 instructing the memory sharing service 444 to change the cache coherency states of one or more cache lines associated with any of the shared data.

In some aspects, the host agent 400 may reconfigure the CXL fabric based on updates associated with memory tiering services. For example, the host agent controller 410 may produce one or more control signals 402 instructing the interconnect management service 424 to tear down one or more existing data paths through the CXL fabric or to establish a new data path from the host computing device to another external memory or storage (such as an HDD or an SSD). Alternatively, or in addition, the host agent controller 410 may produce one or more service requests 406 instructing the memory tiering service 446 to deprovision one or more external memory resources currently allocated to the host computing device or to provision other external memory resources to be used for offloading data assigned to various memory tiers. In some implementations, the newly-provisioned memory resources may be associated with an even lower (or higher) memory tier than that of any memory resources currently allocated to the host computing device.

In some aspects, the host agent 400 may reconfigure the CXL fabric based on updates associated with elastic memory services. For example, the host agent controller 410 may produce one or more control signals 402 instructing the interconnect management service 424 to tear down one or more existing data paths through the CXL fabric or to establish a new data path from the host computing device to another external memory associated with the memory pool. Alternatively, or in addition, the host agent controller 410 may produce one or more service requests 406 instructing the memory elasticity service 448 to deprovision one or more external memory resources currently allocated to the host computing device or to provision other external memory resources from the memory pool. In some implementations, the elastic memory service 448 may dynamically expand the amount of memory available to the host computing device, from the memory pool, in response to increased memory usage or demand by virtual machines and may release memory back into the memory pool as usage or demand subsides.

Figure 5:
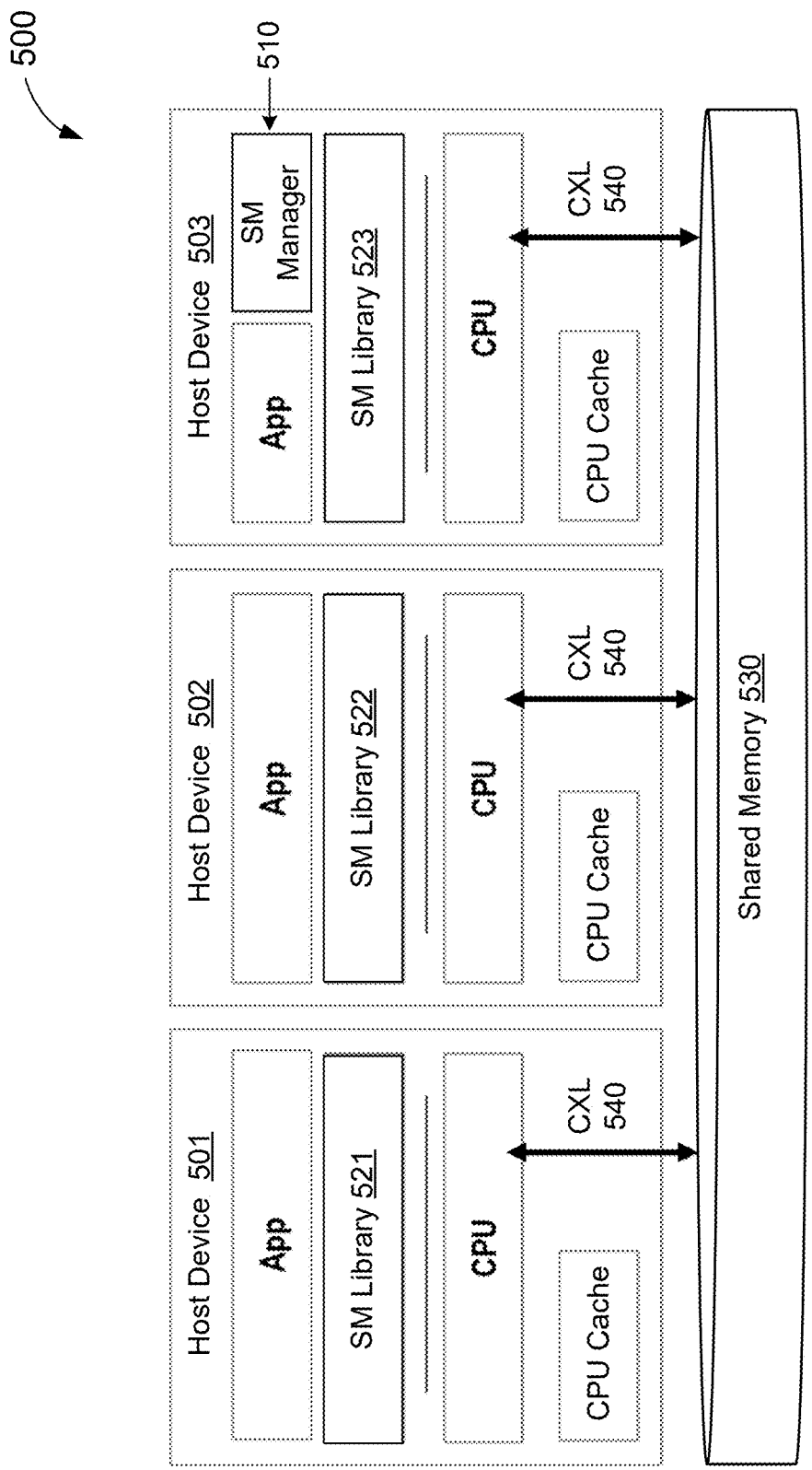
FIG. 5 shows another block diagram of an example memory management system, according to some implementations.

FIG. 5 shows another block diagram of an example memory management system 500, according to some implementations. The memory management system 500 includes a shared memory (SM) manager 510 and multiple SM libraries 521-523 that reside (or execute) on host computing devices 501-503, respectively. In some implementations, the memory management system 500 may be one example of the memory management system 300 of FIG. 3. With reference to FIG. 3, the SM manager 510 may be one example of the orchestration component 310 and each of the SM libraries 521-523 may be one example of any of the host agents 321-324. In the example of FIG. 5, the SM manager 510 is shown to reside (or execute) on the host device 503. However, in actual implementations, the SM manager 510 may reside on any of the host devices 501-503 or another device that does not include an SM library.

Each of the host devices 501-503 includes a processor (labeled "CPU") and a local cache (labeled "CPU cache"). In some implementations, the host devices 501-503 may be coupled to a shared memory 530 via a CXL fabric 540. With reference to FIG. 3, each of the host devices 501-503 may be one example of any of the host devices 301-304, the shared memory 530 may be one example of the memory appliance 305, and the CXL fabric 540 may be one example of the data plane 306. The memory management system 500 provides software-based cache coherency management between the host devices 501-503. More specifically, the SM manager 510 may coordinate with the SM libraries 521-523 to detect and execute the required access semantics (such as which host device is requesting access to what portion of the shared memory 530 at any given time) in a manner that maintains coherency among the local caches.

In some aspects, the memory management system 500 may implement a page-based share semantic detection mechanism to detect and control access to pages of the shared memory 530 (or other granularities of memory). In such aspects, the memory management system 500 may act as a logic gate that intercepts requests from the host devices 501-503 to access one or more pages of the shared memory 530 (in hardware) and selectively grants each memory access request only when the requested access would not create cache coherency issues with any of the other host devices. For example, the memory management system 500 may remove read and write access to such pages of the shared memory 530 and may clear the caches of one or more the host devices 501-503 before granting the requested memory access to a particular host device.

In some implementations, the SM manager 510 may maintain a cache coherency table that tracks a cache coherency state for an "owner" of each page of the shared memory 530 and a cache coherency state for each host device having access to that page. Example cache coherency states may include "invalid," "shared," and "exclusive" states. An "invalid" host state indicates that the associated host device does not have read or write access to the page, whereas an "invalid" owner state indicates that no host devices have read or write access to the page. A "shared" host state indicates that the associated host device shares read access to the page with one or more other host devices, whereas a "shared" owner state indicates that one or more host devices have read access to the page. An "exclusive" host state indicates that the associated host device has exclusive read and write access to the page, whereas an "exclusive" owner state indicates that exactly one host device has access to the page. The SM manager 510 may update the cache coherency table whenever access is granted to, or taken away from, a host device.

In some implementations, the SM libraries 521-523 may intercept requests by the host devices 501-503, respectively, to access pages of the shared memory 530 and communicate with the SM manager 510 to determine whether to grant the access request. More specifically, an SM library may determine whether to grant access to a particular page of the shared memory 530 based on the owner state of the requested page, the host state of the requestor, and the requested access type (such as read or write access). For example, if the SM manager 510 indicates that the owner state of a requested page is "invalid," the SM library intercepting the request may grant the requested access to that page (regardless of the requested access type). If the SM manager 510 indicates that the owner state of a requested page is "shared," and a host device is requesting read access to that page, the SM library intercepting the request may grant the requested access to that page (regardless of whether the host state is "shared" or "invalid").

In some implementations, if a host device requests write access to a particular page of the shared memory 530, the memory management system 500 may flush the caches of other host devices that have access to that page before granting the requested write access. For example, if the host device 501 requests write access to a particular page and the owner state of the requested page is "shared," the SM manager 510 may perform a callback to one or more of the other host devices 502 or 503 via the SM libraries 522 and 523, respectively. In some implementations, a callback may notify the host device that one or more pages of the shared memory 530 (such as a range of addresses) is about to be modified or deleted. Thus, the callback instructs the host device to flush or otherwise clear its cache of any copies of data stored in such pages. The SM libraries 522 or 523 may notify the SM library 521, via the SM manager 510, when their respective host devices have flushed their caches. In response to such notification, the SM library 521 may grant the requested write access to the host device 501.

Tables 1 and 2 provide a detailed summary of the page-based share semantic detection mechanism. More specifically, Table 1 summarizes the operations performed by the memory management system 500 for a host device requesting access to one or more pages of the shared memory 530 (also referred to as the "requestor"). Table 2 summarizes the operations performed by the memory management system 500 for the remaining host devices that are not requesting access to the pages of the shared memory 530 (also referred to as the "non-requestors").

TABLE 1

| Owner State | Requestor State | Is Owner? | Requested Access Read | Requested Access Write |
|---|---|---|---|---|
| Invalid | Invalid | N/A | Grant Shared | Grant Exclusive |
|  | Shared | N/A | Error | Error |
|  | Exclusive | N/A | Error | Error |
| Shared | Invalid | N/A | Grant Shared | Perform Callbacks Grant Exclusive |
|  | Shared | N/A | Grant Shared | Perform Callbacks Grant Exclusive |
|  | Exclusive | N/A | Error | Error |
| Exclusive | Invalid | N/A | Perform Callbacks Grant Shared | Perform Callbacks Grant Exclusive |
|  | Shared | N/A | Error | Error |
|  | Exclusive | Yes | Grant Exclusive | Grant Exclusive |
|  |  | No | Error | Error |

TABLE 2

| Owner State | Non-Requestor State | Requested Access Read | Requested Access Write |
|---|---|---|---|
| Invalid | Invalid | None | None |
|  | Shared | Error | Error |
|  | Exclusive | Error | Error |
| Shared | Invalid | None | None |
|  | Shared | None | Flush Cache Set Invalid |
|  | Exclusive | Error | Error |
| Exclusive | Invalid | None | None |
|  | Shared | Error | Error |
|  | Exclusive | Flush Cache Set Invalid | Flush Cache Set Invalid |

In some other aspects, the memory management system 500 may implement a procedure-based share semantic detection mechanism to detect and control access to objects in the shared memory 530. In such aspects, the memory management system 500 may create, manage, and delete objects in the shared memory 530 responsive to requests received from the host devices 501-503. In some implementations, the memory management system 500 may detect the requested access semantics by intercepting existing sharing-semantic procedure calls (such as RPCs). In some other implementations, the memory management system 500 may detect the requested access semantics by substituting or replacing existing sharing-semantic procedure calls with new shared memory application interfaces (APIs).

In some implementations, the SM manager 510 may provide shared object management services for the host devices 501-503. Example suitable shared object management services may include object creation, configuration, and deletion, among other examples. In some implementations, the SM manager 510 may further provide configuration management services for the host devices 501-503. For example, the SM manager 510 may manage multiple shared memories (not shown for simplicity) each having its own configuration. In such implementations, the configuration management service may manage a respective configuration for each of the shared memories.

The SM libraries 521-523 provide shared memory services for individual host devices 501-503, respectively. In some implementations, the SM libraries 521-523 may enhance existing RPCs that express sharing semantics to encapsulate low-level operations for managing coherency or supporting other services provided by the SM manager 510. In some other implementations, the SM libraries 521-523 may provide new low-level APIs associated with shared memory services. Example shared memory (SM) API requests may include:

- an "SM_connect" request to connect with the SM manager 510;
- an "SM_disconnect" request to disconnect from the SM manager 510;
- an "SM_create" request to create an object in the shared memory 530 (acquiring write-access to the object on behalf of the host device);
- an "SM_seal" request to seal an object in the shared memory 530 (relinquishing write-access to the object on behalf of the host device);
- an "SM_get" request to get an object in the shared memory 530 (acquiring read-access to the object on behalf of the host device);
- an "SM_release" request to release an object in the shared memory 530 (relinquishing read-access to the object on behalf of the host device);

an "SM_delete" request to delete an object in the shared memory 530; and an "SM_subscribe" request to subscribe to notifications indicating when objects in the shared memory 530 are sealed.

In some implementations, the SM manager 510 may manage lock services for each of the host devices 501-503. For example, when an application ("App") executing on a particular host device requires access to an object in the shared memory 530, the application must first acquire a "lock" (such as a read-lock or a write-lock) for the shared object. The type of lock granted to a particular host device governs the access rights of that host device. For example, a write-lock grants a host device permission to write to an object in the shared memory 530 until the host device relinquishes the write-lock, whereas a read-lock grants a host device permission to read from an object in the shared memory 530 until the host device relinquishes the read-lock. Host devices may be granted exclusive write-locks, shared read-locks, or any combination thereof. The SM manager 510 manages the locks for the host devices 501-503 and maintains a mapping of the locks granted to each host device for each object in the shared memory 530.

In some implementations, each of the SM libraries 521-523 may provide individual lock services for its respective host device. For example, when an application executing on a particular host device requires access to the shared memory 530, the SM library residing on that host device may negotiate with the SM manager 510 to acquire the necessary lock associated with the requested access type (such as read or write access) and map the shared memory 530 with the granted access type. In some implementations, each of the SM libraries 521-523 may further communicate with the SM manager 510 to maintain cache coherency and access synchronization (or any other configurations associated with the shared memory 530) across the various host devices 501-503.

In some aspects, the SM manager 510 may grant only one write-lock for any object in the shared memory 530. More specifically, only the host device that created an object is granted a write-lock for the object (upon its creation). In some implementations, the SM libraries 521-523 may perform write-through operations (using CPU non-temporal instructions) on behalf of the host devices 501-503, respectively, to write data directly to the shared memory 530 (rather than writing to a write-back cache followed by a cache flush). When the host device has finished writing to an object, the host device relinquishes its write-lock for that object. In some implementations, an object may become immutable once a host device relinquishes its write-lock for the object. Immutable objects cannot be modified or written to. Thus, any pages of the shared memory 530 that are allocated for an immutable object can be rewritten only after the object is deleted.

To avoid cache coherency issues, the SM manager 510 may wait for a write-lock granted for a particular object to be released or relinquished before granting any read-lock requests for that object. Waiting requests may be queued and processed by the SM manager 510 in order of arrival. In some aspects, the SM manager 510 may grant multiple read-locks, concurrently, for the same object in the shared memory 530. When a host device has finished reading from an object, the host device relinquishes its read-lock for that object. In some aspects, the SM manager 510 may block or deny any further read-lock requests for an object after receiving a request to delete the object. Further, the SM manager 510 may wait for all existing read-locks granted for a particular object to be released or relinquished before deleting that object from the shared memory 530.

In some implementations, the memory management system 500 may flush the local caches of one or more of the host devices 501-503 prior to deleting an object from the shared memory 530. For example, the SM libraries 521-523 may track whether the host devices 501-503, respectively, have accessed any objects in the shared memory 530 and may flush the caches for their respective host devices when any previously-accessed objects are about to be deleted. In some implementations, each of the SM libraries 521-523 may coordinate with the SM manager 510 to ensure that all locks associated with a shared object have been released before the object is deleted from the shared memory 530. In some implementations, each of the SM libraries 521-523 also may provide an API for applications executing on its respective host device to flush the local cache on demand (or when necessary).

In some aspects, each of the SM libraries 521-523 may include a memory allocator for allocating shared memory 530 to its respective host device. For example, the memory allocator may provide GNU C Library (glibc) APIs, such as "malloc," "free," and "realloc." In some implementations, the memory allocator may further provide a special memory barrier function which guarantees that the memory written before the function call is visible to other host devices. In some implementations, the memory allocator may be initialized from memory that has already been used. In some implementations, the shared memory 530 may be subdivided into multiple segments, where each segment can be managed and accessed individually (allowing parallel access to the shared memory 530). In such implementations, each of the SM libraries 521-523 may include a respective instance of the memory allocator for each segment of the shared memory 530.

In some implementations, each of the SM libraries 521-523 may provide an RPC service over the shared memory 530. For example, the RPC service may include RPC APIs that are built on top of the memory allocator and are easier to use. Still further, in some aspects, each of the SM libraries 521-523 may be configured to implement tiering services to improve or optimize memory performance. As described with reference to FIGS. 1 and 4, example suitable tiering operations may include tiering to compressed memory and tiering to storage, among other examples.

In some implementations, the SM manager 510 and SM libraries 521-523 may improve the speed of shared memory access by mapping the address space of the shared memory 530 to the same virtual addresses across all processes associated with the host devices 501-503. As a result, the host devices 501-503 may maintain consistent pointer values to the shared memory 530. In some other implementations, the SM manager 510 and SM libraries 521-523 may improve the speed of shared memory access by allowing objects in the shared memory 530 to only reference other objects in the shared memory 530. In other words, objects in the shared memory 530 may not reference any other objects outside the shared memory 530.

FIGS. 6A-6E show a series of operations 600-640, respectively, that can be performed by a memory management system, according to some implementations. The memory management system is configured to provide memory sharing services for a number of host computing devices (host device A, host device B, and host device C) coupled to a shared memory 650 via a CXL fabric (not shown for simplicity). The memory management system includes an SM manager 604 and a number of SM libraries 601-603 associated with the host devices A—C, respectively. In some implementations, the memory management system may be one example of the memory management system 500 of FIG. 5. With reference to FIG. 5, the SM manager 604 may be one example of the SM manager 510 and each of the SM libraries 601-603 may be one example of any of the SM libraries 521-523.

With reference to FIG. 6A, the SM library 602 receives an SM_create request from host device B and negotiates with the SM manger 604 to create an object 606 in the shared memory 650 based on the SM_create request. For example, the SM manager 604 may allocate, via the CXL fabric, a range of physical memory addresses (or pages) in the shared memory 650 for the object 606 as long as the memory space does not overlap with another object in the shared memory 650. Upon creating the object 606 in the shared memory 650, the SM manager 604 grants or otherwise assigns a write-lock 607 for the object 606 to host device B. The SM manager 604 creates a mapping for the object 606 indicating that a write-lock is assigned to host device B (WL=B) and that no read-locks are currently assigned (RL=none). The SM library 602 also maps a write-lock (WL) to the object 606 and creates a reminder indicating that a cache flush is required (CFR) when the object 606 is deleted. The SM libraries 601 and 603 receive SM_subcribe requests from host devices A and C, respectively, and request to be notified by the SM manager 604 when the object 606 is sealed.

Figure 6B:
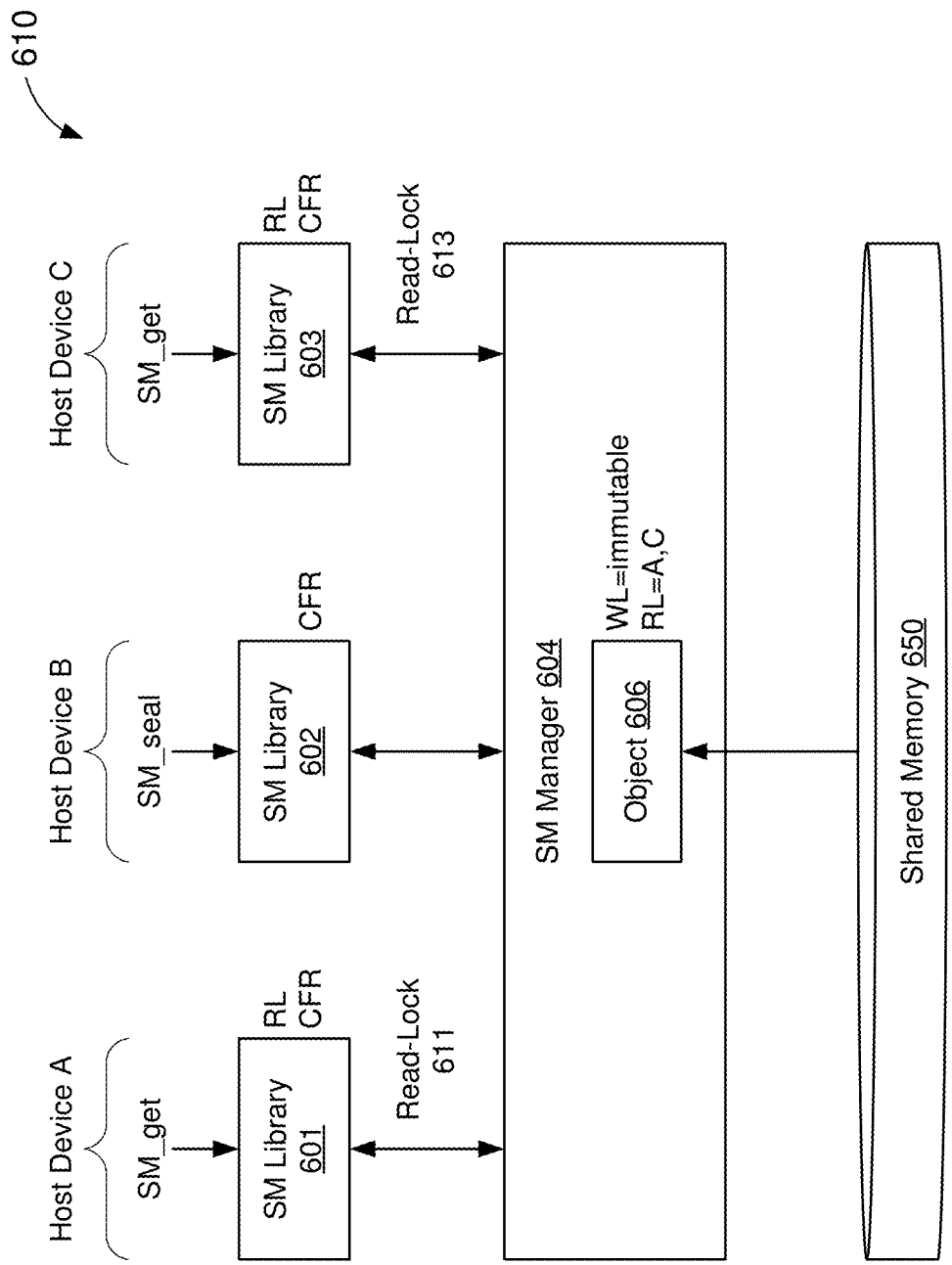

With reference to FIG. 6B, the SM library 602 receives an SM_seal request from host device B and instructs the SM manager 604 to seal the object 606 in the shared memory 650 in response to receive the SM_seal request. For example, the SM manager 604 may seal the object 606 in the shared memory 650 by updating the mapping to indicate that the object 606 is immutable or that no further write-locks may be granted for the object 606 (WL=immutable). The SM manager 604 notifies the SM libraries 601 and 603 when the object 606 has been sealed (responsive to the SM_subscribe requests of FIG. 6A). The SM libraries 601 and 603 receive SM_get requests from host devices A and C, respectively, and negotiate with the SM manager 604 to acquire read-locks for the object 606. For example, the SM manager 604 may grant a read-lock request as long as no write-locks are currently mapped to the object 606. In the example of FIG. 6B, the SM manager 604 grants concurrent read-locks 611 and 613 to host devices A and C, respectively, and updates the mapping to indicate that read-locks are assigned to host devices A and C (RL=A,C). Each of the SM libraries 601 and 603 also maps a read-lock (RL) to the object 606 and creates a reminder indicating that a cache flush is required (CFR) when the object 606 is deleted.

Figure 6C:
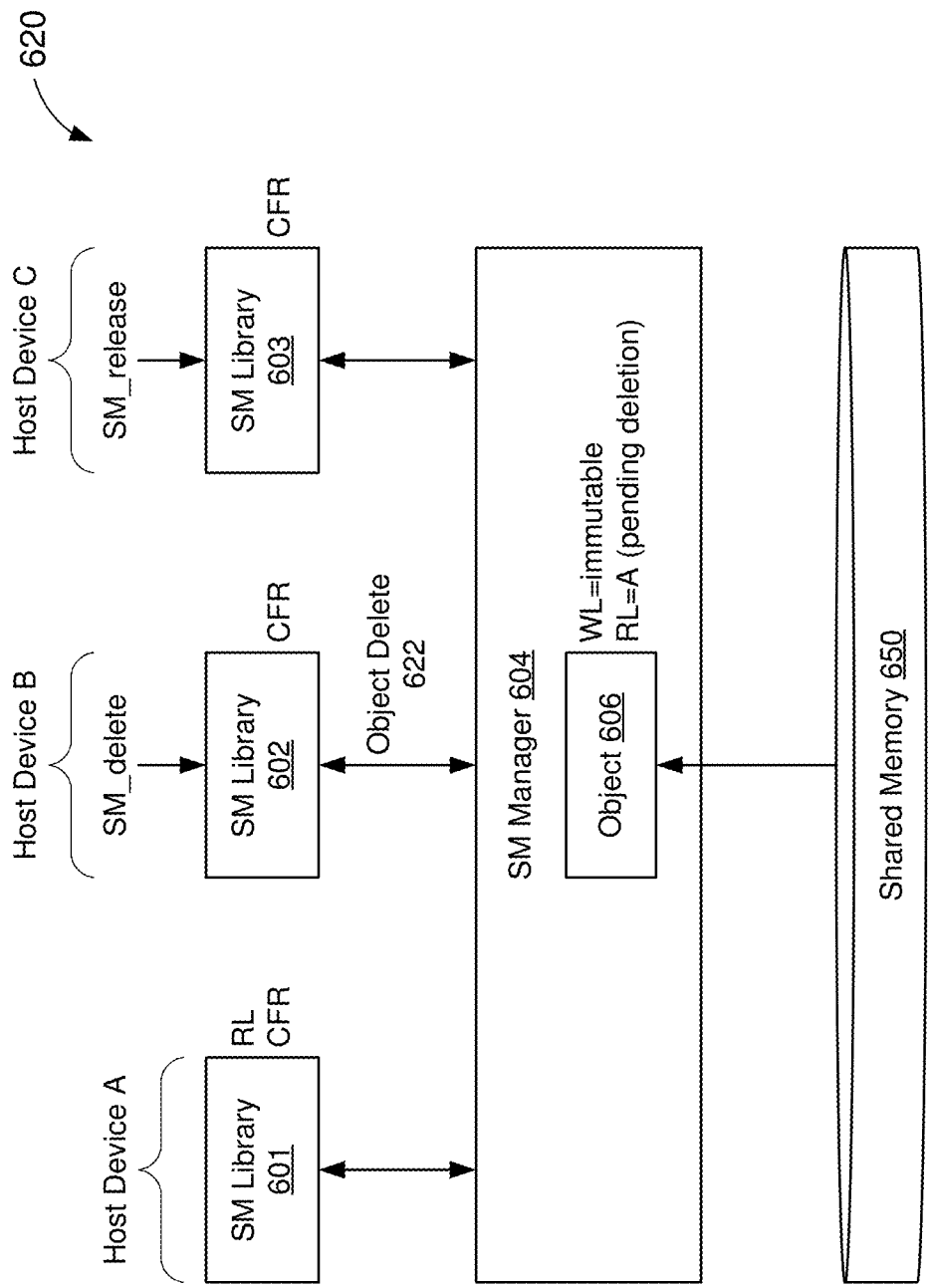

With reference to FIG. 6C, the SM library 603 receives an SM_release request from host device C and relinquishes its read-lock for the object 606 in the shared memory 650. In response, the SM manager 604 updates its mapping to indicate that only host device A is currently assigned a read-lock for the object 606 (RL=A). The SM library 602 receives an SM_delete request from host device B and negotiates with the SM manager 604 to delete the object 606 from the shared memory 650. As described with reference to FIG. 5, the SM manager 604 may delete a shared object only when all host devices (that accessed the object 606) have released their respective locks for the object. Because host device A has not yet relinquished its read-lock, the SM manager 604 does not delete the object 606 from the shared memory 650. Instead, the SM manager 604 queues an object delete request 622 and blocks or denies any further read-lock requests for the object 606.

Figure 6D:
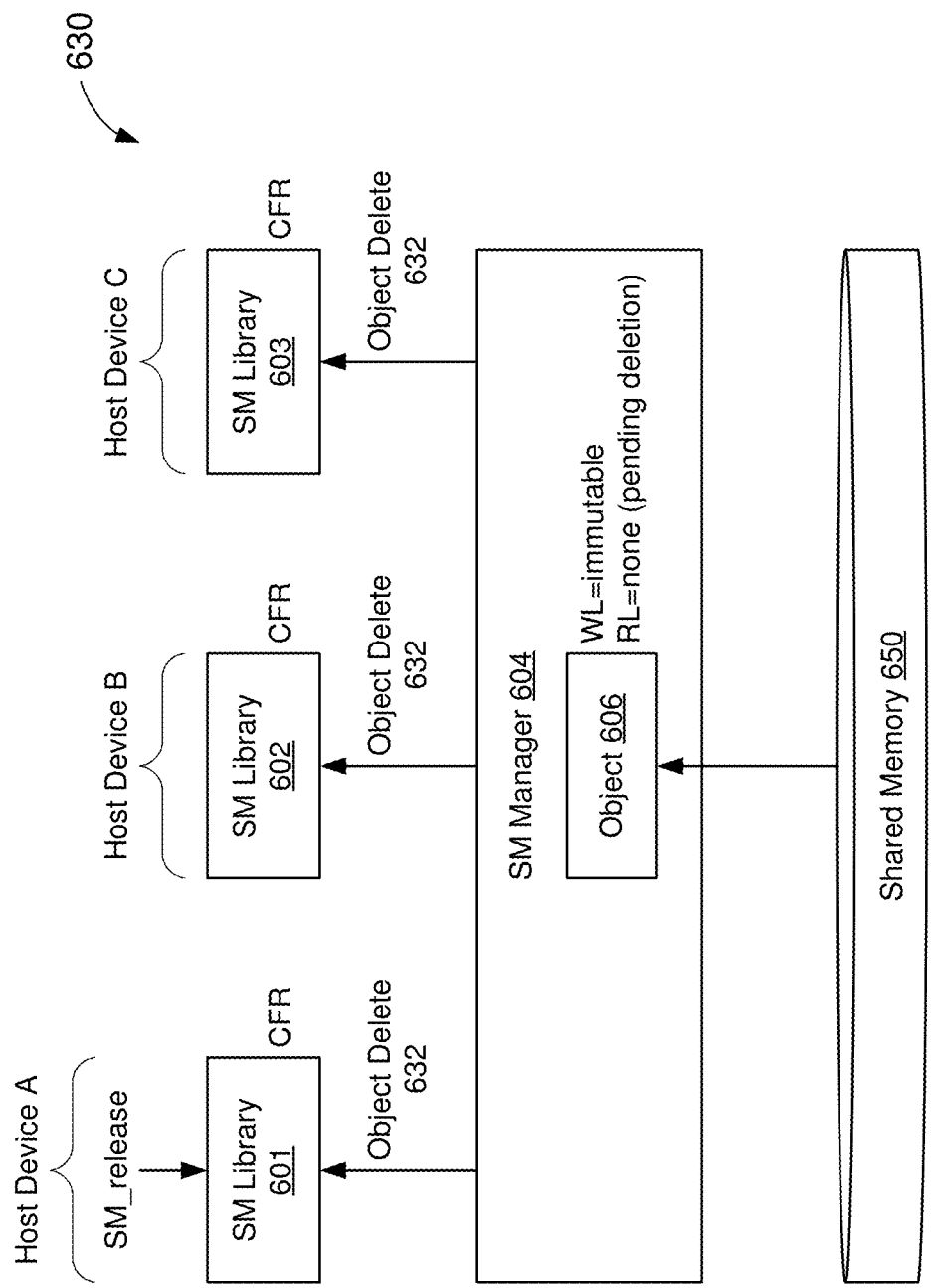

With reference to FIG. 6D, the SM library 601 receives an SM_release request from host device A and relinquishes its read-lock for the object 606 in the shared memory 650. In response, the SM manager 604 updates its mapping to indicate that no host devices are currently assigned a read-lock for the object 606 (RL=none). Because all read-locks (and write-locks) for the object 606 have been released, the SM manager 604 may process the object delete request 622 received from host device B (in FIG. 6C). For example, the SM manager 604 may provide a notification 632 to each of the SM libraries 601-603 indicating that the object 606 is about to be deleted from the shared memory 650. Each of the SM libraries 601-603 responds to the notification 632 by checking whether its respective host device has a cache flush request (CFR) mapped to the object 606 (indicating that the host device has previously accessed the object 606) and flushing the local cache of the host device if a CFR is detected. In the example of FIG. 6D, each of the host devices A-C has a CFR mapped to the object 606. Thus, the SM libraries 601-603 may flush the caches of the host devices A-C, respectively, in response to the object delete notification 632.

Figure 6E:
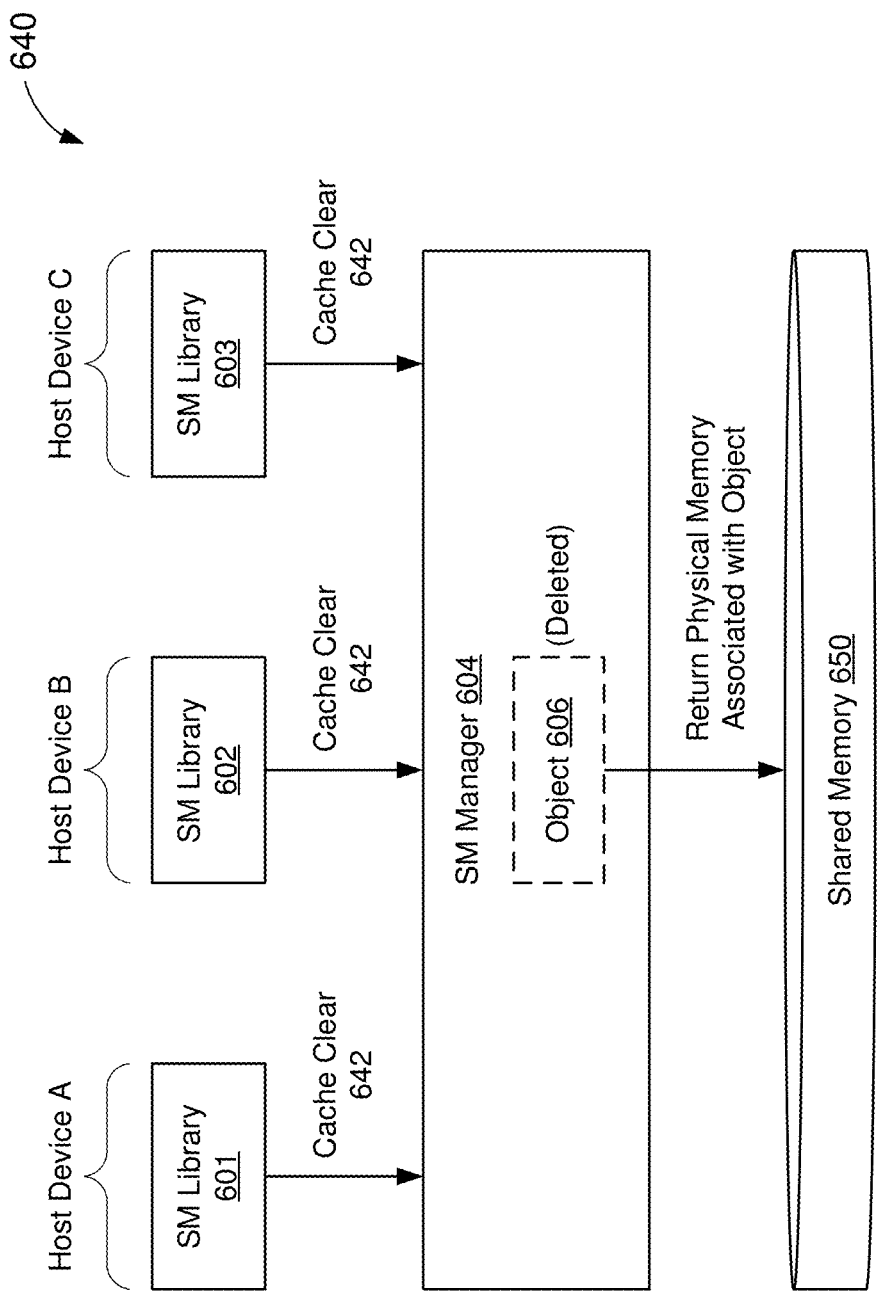

With reference to FIG. 6E, each of the SM libraries 601-603 provides a report 642 to the SM manager 604 indicating that the cache of its associated host device is clear of any shared data that may be stored in the object 606. For example, each of the SM libraries 601-603 may provide the report 642 to the SM manager 604 responsive to flushing the cache of its associated host device. In some implementations, the SM manager 604 may require a report from every host device coupled to the shared memory 650 (regardless of whether the host device had to perform a cache flush operation) before deleting the object 606 from the shared memory 650. After receiving the report 642 from all of the SM libraries 601-603, the SM manager 604 may proceed to delete the object 606 from the shared memory 650. For example, the SM manager 604 may free or return the physical memory addresses (or pages) associated with the object 606 back to the shared memory 650 so that such memory resources can be used by other processes or tasks.

Figure 7:
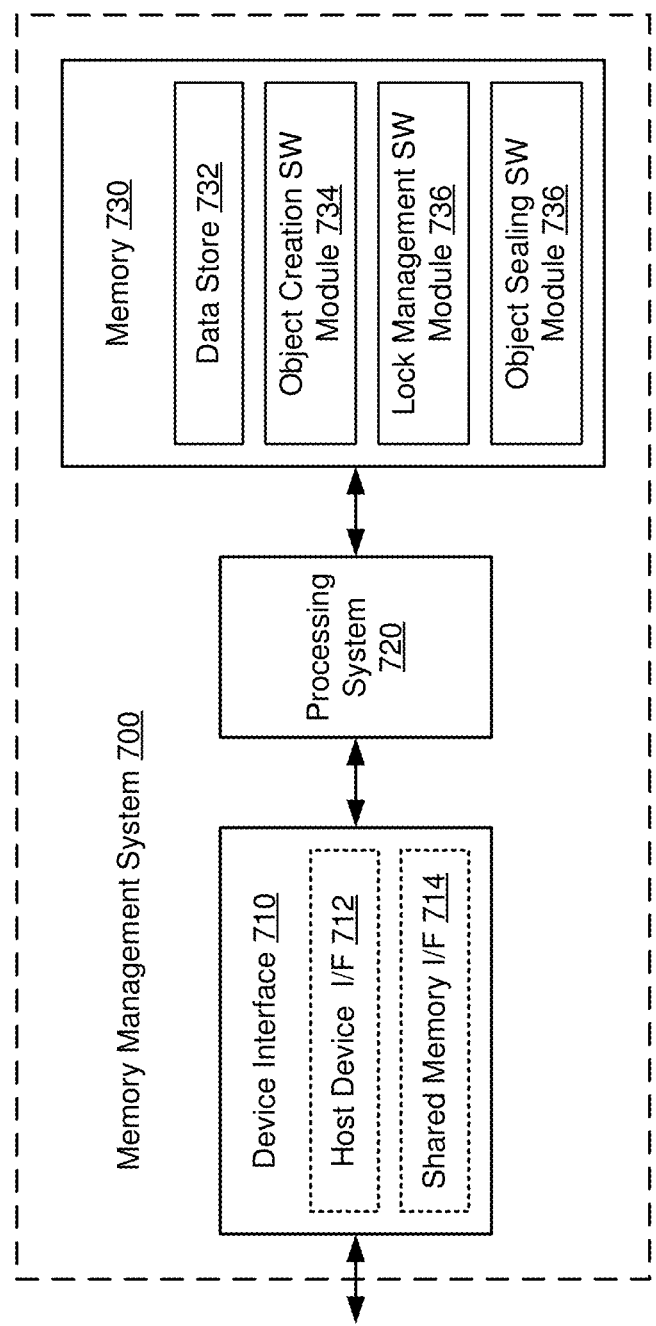
FIG. 7 shows another block diagram of an example memory management system, according to some implementations.

FIG. 7 shows another block diagram of an example memory management system 700, according to some implementations. The memory management system 700 is configured to provide shared memory services over a CXL system. The CXL system may include one or more host computing devices and one or more CXL devices coupled via a CXL fabric. In some implementations, the memory management system 700 may be one example of any of the memory management systems 300 or 500 of FIGS. 3 and 5, respectively. With reference for example to FIG. 5, each host computing device may be one example of any of the host devices 501-503 and the CXL device may be one example of the shared memory 530, and the CXL fabric may be one example of the CXL fabric 540.

The memory management system 700 includes a device interface 710, a processing system 720, and a memory 730. The device interface 710 is configured to communicate with one or more devices associated with the CXL system (such as the host computing devices or the CXL devices). For example, the device interface 710 may include a host device interface (I/F) 712 configured to communicate with a host computing device of a CXL subsystem and a CXL device interface (I/F) 714 configured to communicate with a CXL device of the CXL subsystem. In some implementations, the host device I/F 712 may receive, from a host device, requests to acquire and relinquish a write-lock for an object (such as the SM_create and SM_seal requests of FIG. 5).

The memory 730 may include a data store 732 configured to store data and other information associated with the shared memory services. The memory 730 also may include a non-transitory computer-readable medium (including one or more nonvolatile memory elements, such as EPROM, EEPROM, Flash memory, or a hard drive, among other examples) that may store at least the following software (SW) modules:

- an object creation SW module 734 to create an object in the memory shared by the plurality of host computing devices over the CXL fabric;
- a lock management SW module 736 to map a write-lock to the object in the shared memory responsive to creating the object, where the write-lock grants a first host computing device of the plurality of host computing devices exclusive access for writing to the object; and
- an object sealing SW module 738 to seal the object in the shared memory so that the object is immutable based on receiving a request to relinquish the write-lock.

Each software module includes instructions that, when executed by the processing system 720, causes the memory management system 700 to perform the corresponding functions.

The processing system 720 may include any suitable one or more processors capable of executing scripts or instructions of one or more software programs stored in the memory management system 700 (such as in the memory 730). For example, the processing system 720 may execute the object creation SW module 734 to create an object in the memory shared by the plurality of host computing devices over the CXL fabric. The processing system 720 also may execute the lock management SW module 736 to map a write-lock to the object in the shared memory responsive to creating the object, where the write-lock grants a first host computing device of the plurality of host computing devices exclusive access for writing to the object. Further, the processing system 720 may execute the object sealing SW module 738 to seal the object in the shared memory so that the object is immutable based on receiving a request to relinquish the write-lock.

Figure 8:
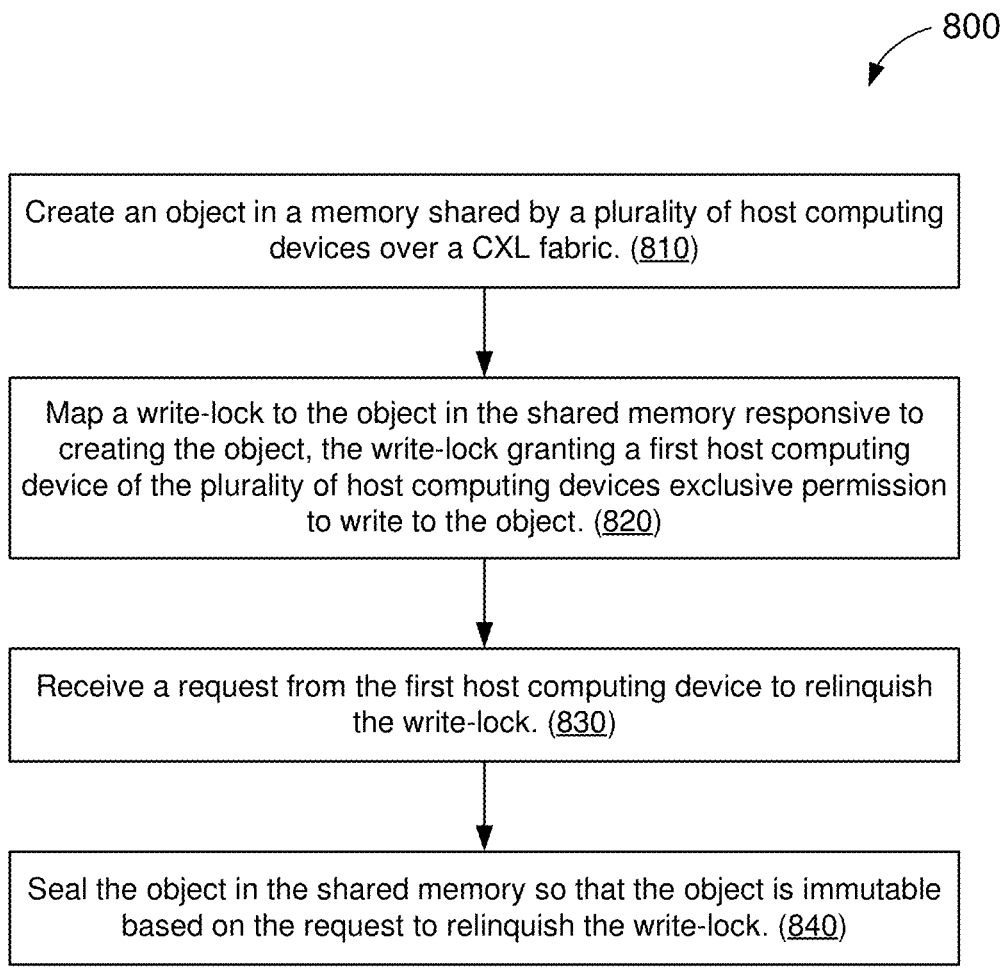
FIG. 8 shows an illustrative flowchart depicting an example operation for memory management, according to some implementations.

FIG. 8 shows an illustrative flowchart depicting an example operation 800 for memory management, according to some implementations. In some implementations, the example operation 800 may be performed by a memory management system such as any of the memory management systems 300, 500, or 700 of FIGS. 3, 5, and 7, respectively.

The memory management system creates an object in a memory shared by a plurality of host computing devices via a CXL fabric (810). In some implementations, each host computing device of the plurality of host computing devices may represent a root complex of a respective CXL subsystem. The memory management system maps a write-lock to the object in the shared memory responsive to creating the object, where the write-lock grants a first host computing device of the plurality of host computing devices exclusive access for writing to the object (820). The memory management system further receives a request from the first host computing device to relinquish the write-lock (830). The memory management system seals the object in the shared memory so that the object is immutable based on the request to relinquish the write-lock (840).

In some aspects, the memory management system may further receive a request from the first host computing device to write data to the object in the shared memory prior to relinquishing the write-lock and may perform a write-through operation that writes the data directly to the shared memory, via one or more CXL protocols, without modifying a cache associated with the first host computing device.

In some aspects, the memory management system may further receive a request from a second host computing device of the plurality of host computing devices to access the object in the shared memory, determine whether one or more locks, including a write-lock or a read-lock, are mapped to the object, and control access to the object by the second host computing device based at least in part on whether one or more locks are mapped to the object. In some implementations, the controlling of access to the object may include preventing the second host computing device from accessing the object while the write-lock is mapped to the object.

In some aspects, the request to access the object in the shared memory may be associated with a request to read from the object. In some implementations, the controlling of access to the object may include mapping a first read-lock to the object based on the access request when no locks are mapped to the object, where the read-lock grants the second host computing device access for reading from the object in the shared memory. In some other implementations, the controlling of access to the object may include mapping a first read-lock to the object based on the access request when one or more second read-locks are mapped to the object, where the first read-lock grants the second host computing device access for reading from the object in the shared memory.

In some aspects, the memory management system may further receive a request to delete the object in the shared memory, block any requests to access the object received after the request to delete the object, and delete the object from the shared memory when no locks are mapped to the object. In some implementations, the deleting of the object may include determining whether each host computing device of the plurality of host computing devices has previously accessed the object and flushing a respective cache associated with any host computing device of the plurality of host computing devices that has previously accessed the object, where the object is deleted only after all the caches associated with any host computing device of the plurality of host computing devices that has previously accessed the object have been flushed.

Figure 9:
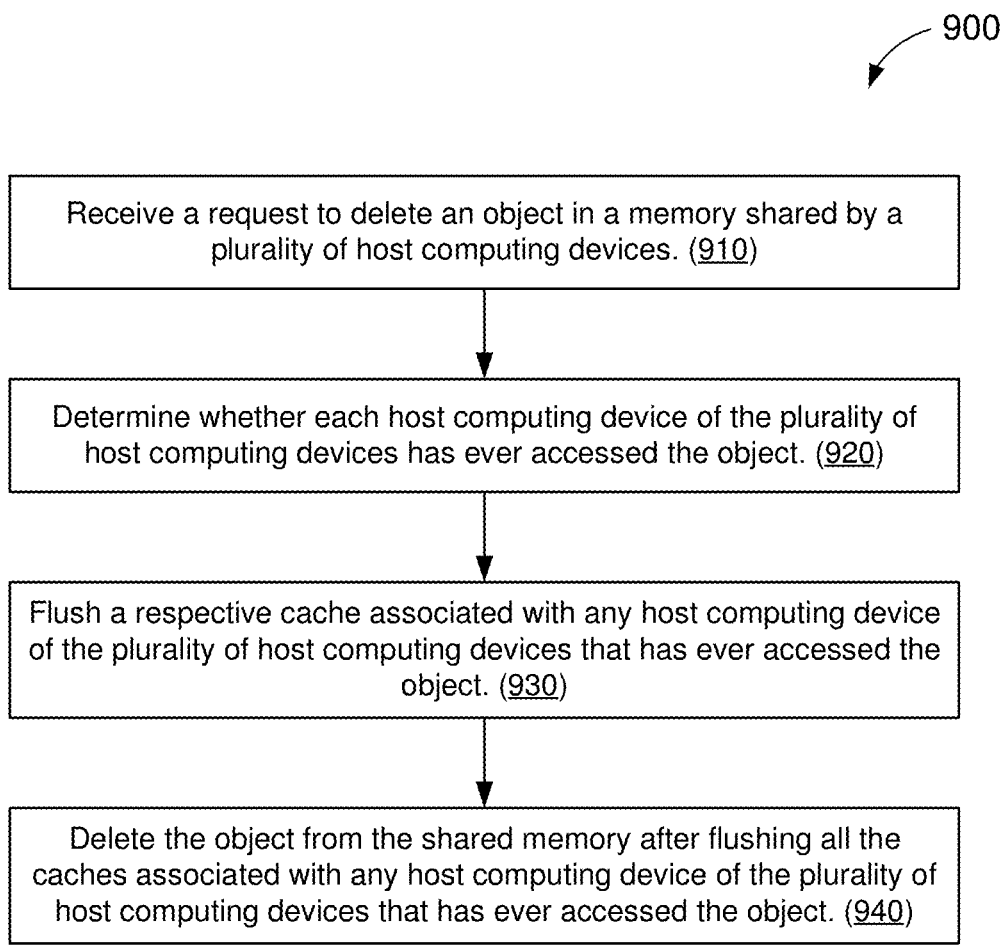
FIG. 9 shows another illustrative flowchart depicting an example operation for memory management, according to some implementations.

FIG. 9 shows another illustrative flowchart depicting an example operation 900 for memory management, according to some implementations. In some implementations, the example operation 900 may be performed by a memory a management system such as any of the memory management systems 300, 500, or 700 of FIGS. 3, 5, and 7, respectively.

The memory management system receives a request to delete an object in a memory shared by a plurality of host computing devices (910). The memory management system determines whether each host computing device of the plurality of host computing devices has ever accessed the object (920). The memory management system further flushes a respective cache associated with any host computing device of the plurality of host computing devices that has ever accessed the object (930). The memory management system deletes the object from the shared memory after flushing all the caches associated with any host computing device of the plurality of host computing devices that has ever accessed the object (940).

In some aspects, the memory management system may further block any requests to access the object received after the request to delete the object and determine whether one or more locks, including a write-lock or a read-lock, are mapped to the object, the object being deleted when no locks are mapped to the object. In some implementations, each host computing device of the plurality of host computing devices may represent a root complex of a respective CXL subsystem and the memory may be shared by the plurality of host computing devices via a CXL fabric.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of memory management, comprising:
creating a virtual memory object in a memory shared by a plurality of host computing devices via a Compute Express Link (CXL) fabric;
mapping a write-lock to the virtual memory object in the shared memory responsive to creating the virtual memory object, the write-lock granting a first host computing device of the plurality of host computing devices exclusive access for writing to the virtual memory object;
receiving a request from the first host computing device to relinquish the write-lock; and
sealing, in response to receiving the request to relinquish the write-lock, the virtual memory object in the shared memory so that the virtual memory object is immutable.

2. The method of claim 1, wherein each host computing device of the plurality of host computing devices represents a root complex of a respective CXL subsystem.

3. The method of claim 1, further comprising:
receiving a request from the first host computing device to write data to the virtual memory object in the shared memory prior to relinquishing the write-lock; and
performing a write-through operation that writes the data directly to the shared memory, via one or more CXL protocols, without modifying a cache associated with the first host computing device.

4. The method of claim 1, further comprising:
receiving a request from a second host computing device of the plurality of host computing devices to access the virtual memory object in the shared memory;
determining whether one or more locks, including a write-lock or a read-lock, are mapped to the virtual memory object; and
controlling access to the virtual memory object by the second host computing device based at least in part on whether one or more locks are mapped to the virtual memory object.

5. The method of claim 4, wherein the controlling of access to the virtual memory object comprises:
preventing the second host computing device from accessing the virtual memory object while the write-lock is mapped to the virtual memory object.

6. The method of claim 4, wherein the request to access the virtual memory object in the shared memory is associated with a request to read from the virtual memory object.

7. The method of claim 6, wherein the controlling of access to the virtual memory object comprises:
mapping a first read-lock to the virtual memory object based on the access request when no locks are mapped to the virtual memory object, the read-lock granting the second host computing device access for reading from the virtual memory object in the shared memory.

8. The method of claim 6, wherein the controlling of access to the virtual memory object comprises:
mapping a first read-lock to the virtual memory object based on the access request when one or more second read-locks are mapped to the virtual memory object, the first read-lock granting the second host computing device access for reading from the virtual memory object in the shared memory.

9. The method of claim 1, further comprising:
receiving a request to delete the virtual memory object in the shared memory;
blocking any requests to access the virtual memory object received after the request to delete the virtual memory object; and
deleting the virtual memory object from the shared memory when no locks are mapped to the virtual memory object.

10. The method of claim 9, wherein the deleting of the virtual memory object comprises:
determining whether each host computing device of the plurality of host computing devices has previously accessed the virtual memory object; and
flushing a respective cache associated with any host computing device of the plurality of host computing devices that has previously accessed the virtual memory object, the virtual memory object being deleted only after all the caches associated with any host computing device of the plurality of host computing devices that has previously accessed the virtual memory object have been flushed.

11. A memory management system comprising:

a processing system; and a memory storing instructions that, when executed by the processing system, causes the memory management system to:

create a virtual memory object in a memory shared by a plurality of host computing devices via a Compute Express Link (CXL) fabric;

map a write-lock to the virtual memory object in the shared memory responsive to creating the virtual memory object, the write-lock granting a first host computing device of the plurality of host computing devices exclusive access for writing to the virtual memory object;

receive a request from the first host computing device to relinquish the write-lock; and seal, in response to receiving the request to relinquish the write-lock, the virtual memory object in the shared memory so that the virtual memory object is immutable.

12. The memory management system of claim 11, wherein each host computing device of the plurality of host computing devices represents a root complex of a respective CXL subsystem.

13. The memory management system of claim 11, wherein execution of the instructions further causes the memory management system to:

receive a request from the first host computing device to write data to the virtual memory object in the shared memory prior to relinquishing the write-lock; and perform a write-through operation that writes the data directly to the shared memory, via one or more CXL protocols, without modifying a cache associated with the first host computing device.

14. The memory management system of claim 11, wherein execution of the instructions further causes the memory management system to:

receive a request from a second host computing device of the plurality of host computing devices to access the virtual memory object in the shared memory;

determine whether one or more locks, including a write-lock or a read-lock, are mapped to the virtual memory object; and control access to the virtual memory object by the second host computing device based at least in part on whether one or more locks are mapped to the virtual memory object.

15. The memory management system of claim 14, wherein the controlling of access to the virtual memory object comprises:

preventing the second host computing device from accessing the virtual memory object while the write-lock is mapped to the virtual memory object.

16. The memory management system of claim 14, wherein the request to access the virtual memory object in the shared memory is associated with a request to read from the virtual memory object, the controlling of access to the virtual memory object comprising:

mapping a first read-lock to the virtual memory object based on the access request when one or more second read-locks are mapped to the virtual memory object or when no locks are mapped to the virtual memory object, the first read-lock granting the second host computing device access for reading from the virtual memory object in the shared memory.

17. The memory management system of claim 11, wherein execution of the instructions further causes the memory management system to:

receive a request to delete the virtual memory object in the shared memory;

block any requests to access the object received after the request to delete the virtual memory object;

determine whether each host computing device of the plurality of host computing devices has previously accessed the virtual memory object;

flush a respective cache associated with any host computing device of the plurality of host computing devices that has previously accessed the virtual memory object; and delete the virtual memory object from the shared memory when no locks are mapped to the virtual memory object and after all the caches associated with any host computing device of the plurality of host computing devices that has previously accessed the virtual memory object have been flushed.

18. A method of memory management, comprising:

receiving a request to delete an object in a memory shared by a plurality of host computing devices;

determining whether each host computing device of the plurality of host computing devices has ever accessed the object;

flushing a respective cache associated with any host computing device of the plurality of host computing devices that has ever accessed the object; and deleting the object from the shared memory after flushing all the caches associated with any host computing device of the plurality of host computing devices that has ever accessed the object.

19. The method of claim 18, further comprising:

blocking any requests to access the object received after the request to delete the object; and determining whether one or more locks, including a write-lock or a read-lock, are mapped to the object, the object being deleted when no locks are mapped to the object.

20. The method of claim 18, wherein each host computing device of the plurality of host computing devices represents a root complex of a respective Compute Express Link (CXL) subsystem and the memory is shared by the plurality of host computing devices via a CXL fabric.

\* \* \* \* \*